(12) United States Patent
Yamamoto et al.

(10) Patent No.: US 7,623,465 B2
(45) Date of Patent: Nov. 24, 2009

(54) NETWORK MONITORING PROGRAM, NETWORK SYSTEM AND NETWORK MONITORING METHOD

(75) Inventors: Takashi Yamamoto, Kawasaki (JP); Takahiro Saito, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 450 days.

(21) Appl. No.: 11/117,776

(22) Filed: Apr. 29, 2005

(65) Prior Publication Data
US 2006/0164999 A1    Jul. 27, 2006

(30) Foreign Application Priority Data
Jan. 27, 2005    (JP) .............................. 2005-019146

(51) Int. Cl.
*G01R 31/08* (2006.01)
(52) U.S. Cl. ..................................... 370/242
(58) Field of Classification Search ......... 370/241–253, 370/216–228
See application file for complete search history.

(56) References Cited

U.S. PATENT DOCUMENTS

| | | | | |
|---|---|---|---|---|
| 6,046,988 | A * | 4/2000 | Schenkel et al. | 370/254 |
| 6,909,693 | B1 * | 6/2005 | Firoiu et al. | 370/235 |
| 7,065,482 | B2 * | 6/2006 | Shorey et al. | 709/224 |
| 2001/0050901 | A1 * | 12/2001 | Love et al. | 370/235 |
| 2002/0095498 | A1 * | 7/2002 | Chanda et al. | 709/225 |
| 2002/0095512 | A1 * | 7/2002 | Rana et al. | 709/232 |
| 2002/0099818 | A1 * | 7/2002 | Russell et al. | 709/224 |
| 2002/0174216 | A1 * | 11/2002 | Shorey et al. | 709/224 |
| 2002/0198984 | A1 * | 12/2002 | Goldstein et al. | 709/224 |
| 2003/0115319 | A1 * | 6/2003 | Dawson et al. | 709/224 |
| 2003/0214954 | A1 * | 11/2003 | Oldak et al. | 370/400 |
| 2004/0015579 | A1 * | 1/2004 | Cooper et al. | 709/223 |
| 2005/0010817 | A1 * | 1/2005 | Jakubik et al. | 713/201 |
| 2005/0102382 | A1 * | 5/2005 | MacGregor et al. | 709/223 |
| 2006/0007901 | A1 * | 1/2006 | Roskowski et al. | 370/338 |
| 2006/0050649 | A1 * | 3/2006 | Botton-Dascal et al. | 370/252 |
| 2006/0168274 | A1 * | 7/2006 | Aloni et al. | 709/230 |

FOREIGN PATENT DOCUMENTS

| | | |
|---|---|---|
| JP | 2002-319941 | 10/2002 |
| JP | 2003-524997 | 8/2003 |
| JP | 2004-086522 | 3/2004 |
| WO | WO 01/63825 | 8/2001 |

* cited by examiner

*Primary Examiner*—Kwang B Yao
*Assistant Examiner*—Kenan Cehic
(74) *Attorney, Agent, or Firm*—Fujitsu Patent Center

(57) ABSTRACT

A network system capable of easily, if a communication abnormality occurs at an application level, troubleshooting a cause of the abnormality, includes a plurality of monitoring target computers, a network monitoring device and a plurality of network devices for relaying TCP communications, wherein each monitoring target computer sends, if the on-performing TCP communication comes into an abnormal status, a fault notifying message showing a content of this abnormal status to the network monitoring device, and the network monitoring device has a function of displaying the content of the received fault notifying message.

7 Claims, 25 Drawing Sheets

FIG. 3

| No. | SELF-SIDE IP ADDRESS | PARTNER-SIDE IP ADDRESS | SELF-SIDE PORT NUMBER | PARTNER-SIDE PORT NUMBER | TCP RETRANS- MISSION COUNT | PACKET DISCARD COUNT |
|---|---|---|---|---|---|---|
| 1 | 10.1.1.1 | 10.1.3.1 | 23 | 5382 | 33 | 22 |
| 2 | 10.1.1.1 | 10.1.2.2 | 80 | 18263 | 0 | 0 |

| No. | SELF-SIDE IP ADDRESS | PARTNER-SIDE IP ADDRESS | SELF-SIDE PORT NUMBER | PARTNER-SIDE PORT NUMBER |
|---|---|---|---|---|
| 1 | * | 10.1.3.1 | * | * |
| 2 | * | * | 80 | * |

| SELF-SIDE IP ADDRESS | PARTNER-SIDE IP ADDRESS | SELF-SIDE PORT NUMBER | PARTNER-SIDE PORT NUMBER | FAULT CONTENT MESSAGE NUMBER |
|---|---|---|---|---|
| 10.1.1.1 | 10.1.3.1 | 23 | 5382 | 10010 |

FIG. 9

| NODE ID | NODE MANAGEMENT ADDRESS | NODE NAME | DEVICE TYPE | SNMP COMMUNITY NAME | TELNET USER ACCOUNT | TELNET PASSWORD |
|---|---|---|---|---|---|---|
| 1 | 10.1.1.1 | COMPUTER A | SERVER | publicA | UserA | PasswdA |
| 2 | 10.1.2.2 | COMPUTER B | SERVER | publicB | UserB | PasswdB |
| 3 | 10.1.3.1 | COMPUTER C | SERVER | publicC | UserC | PasswdC |
| 4 | 10.10.1.1 | ROUTER1 | ROUTER | public1 | Router1 | Passwd1 |
| 5 | 10.10.1.2 | ROUTER2 | ROUTER | public2 | Router2 | Passwd2 |
| 6 | 10.10.1.3 | ROUTER3 | ROUTER | public3 | Router3 | Passwd3 |
| 7 | 10.10.1.4 | ROUTER4 | ROUTER | public4 | Router4 | Passwd4 |
| 8 | 10.10.1.5 | ROUTER5 | ROUTER | public5 | Router5 | Passwd5 |
| 9 | 10.10.1.6 | ROUTER6 | ROUTER | public6 | Router6 | Passwd6 |
| 10 | 10.10.1.7 | ROUTER7 | ROUTER | public7 | Router7 | Passwd7 |

FIG. 10

| NAME | STATUS | DEVICE TYPE | DETAILS |
|---|---|---|---|
| COMPUTER A | TCP COMMUNICATION FAULT | NODE | EXCESS OF PACKET DISCARD COUNT (ERROR)<br>SELF-SIDE IP ADDRESS = 10.1.1.1<br>PARTNER-SIDE IP ADDRESS = 10.1.3.1<br>SELF-SIDE PORT NUMBER = 23<br>PARTNER-SIDE PORT NUMBER = 5382 |
| COMPUTER C | TCP COMMUNICATION FAULT | NODE | EXCESS OF TCP RETRANSMISSION COUNT (ERROR)<br>SELF-SIDE IP ADDRESS = 10.1.1.1<br>PARTNER-SIDE IP ADDRESS = 10.1.3.1<br>SELF-SIDE PORT NUMBER = 5302<br>PARTNER-SIDE PORT NUMBER = 23 |

RED: TCP COMMUNICATION FAULT OCCURRED COMPUTER

RED: TCP COMMUNICATION FAULT OCCURRED COMPUTER

| FAULT OCCURRENCE TIME | FAULT TYPE | OBJECT ID | FAULT CONTENT MESSAGE NUMBER | ADDITIONAL INFORMATION |
|---|---|---|---|---|
| 10:53:40 | TCP COMMUNI-CATION FAULT | 1 | 10010 | 10.1.1.1, 10.1.3.1, 23, 5382 |

FIG. 15

| SELF-SIDE IP ADDRESS | PARTNER-SIDE IP ADDRESS | SELF-SIDE PORT NUMBER | PARTNER-SIDE PORT NUMBER | FAULT CONTENT MESSAGE NUMBER | NOTIFYING TIME |
|---|---|---|---|---|---|
| 10.1.1.1 | 10.1.3.1 | 23 | 5382 | 10010 | 10:53:40 |

FIG. 19 (A)

| SELF-SIDE IP ADDRESS | PARTNER-SIDE IP ADDRESS | SELF-SIDE PORT NUMBER | PARTNER-SIDE PORT NUMBER | FAULT CONTENT MESSAGE NUMBER | NOTIFYING TIME |
|---|---|---|---|---|---|
| 10.1.1.1 | 10.1.3.1 | 23 | 5382 | 10010 | 10:53:40 |

FIG. 19 (B)

| SELF-SIDE IP ADDRESS | PARTNER-SIDE IP ADDRESS | SELF-SIDE PORT NUMBER | PARTNER-SIDE PORT NUMBER | FAULT CONTENT MESSAGE NUMBER | NOTIFYING TIME |
|---|---|---|---|---|---|
| 10.1.1.1 | 10.1.3.1 | 23 | 5382 | 10010 | 10:53:40 |
| 10.1.2.2 | 10.1.1.1 | 18263 | 80 | 10020 | 10:54:10 |

FIG. 19 (C)

| SELF-SIDE IP ADDRESS | PARTNER-SIDE IP ADDRESS | SELF-SIDE PORT NUMBER | PARTNER-SIDE PORT NUMBER | FAULT CONTENT MESSAGE NUMBER | NOTIFYING TIME |
|---|---|---|---|---|---|
| 10.1.2.2 | 10.1.1.1 | 18263 | 80 | 10020 | 10:54:10 |

FIG. 19 (D)

| SELF-SIDE IP ADDRESS | PARTNER-SIDE IP ADDRESS | SELF-SIDE PORT NUMBER | PARTNER-SIDE PORT NUMBER | FAULT CONTENT MESSAGE NUMBER | NOTIFYING TIME |
|---|---|---|---|---|---|

FIG.20

| SELF-SIDE IP ADDRESS | PARTNER-SIDE IP ADDRESS | SELF-SIDE PORT NUMBER | PARTNER-SIDE PORT NUMBER | FAULT CONTENT MESSAGE NUMBER |
|---|---|---|---|---|
| 10.1.2.2 | 10.1.1.1 | 18263 | 80 | 10020 |

FIG.21

| SELF-SIDE IP ADDRESS | PARTNER-SIDE IP ADDRESS | SELF-SIDE PORT NUMBER | PARTNER-SIDE PORT NUMBER | FAULT CONTENT MESSAGE NUMBER |
|---|---|---|---|---|
| 10.1.3.1 | 10.1.1.1 | 5382 | 23 | 10010 |

FIG.22

| NAME | STATUS | DEVICE TYPE | DETAILS |
|---|---|---|---|
| COMPUTER A | TCP COMMUNICATION FAULT | NODE | EXCESS OF PACKET DISCARD COUNT (ERROR)<br>AGGREGATE FLAG = 1<br>SELF-SIDE IP ADDRESS = 10.1.1.1<br>PARTNER-SIDE IP ADDRESS = 10.1.3.1<br>SELF-SIDE PORT NUMBER = 23<br>PARTNER-SIDE PORT NUMBER = 5382<br>PARTNER-SIDE NODE NAME = COMPUTER C |

FIG.23

| NAME | STATUS | DEVICE TYPE | DETAILS |
|---|---|---|---|
| COMPUTER A | TCP COMMUNICATION FAULT | NODE | EXCESS OF PACKET DISCARD COUNT (ERROR)<br>SELF-SIDE IP ADDRESS = 10.1.1.1<br>PARTNER-SIDE IP ADDRESS = 10.1.3.1<br>SELF-SIDE PORT NUMBER = 23<br>PARTNER-SIDE PORT NUMBER = 5382 |
| COMPUTER C | TCP COMMUNICATION FAULT | NODE | EXCESS OF PACKET DISCARD COUNT (ERROR)<br>SELF-SIDE IP ADDRESS = 10.1.1.1<br>PARTNER-SIDE IP ADDRESS = 10.1.3.1<br>SELF-SIDE PORT NUMBER = 5382<br>PARTNER-SIDE PORT NUMBER = 23 |

| No. | IP ADDRESS OF NODE ON ROUTE |
|---|---|
| 1 | 10.1.1.254 |
| 2 | 10.2.1.2 |
| 3 | 10.2.3.2 |
| 4 | 10.2.1.2 |
| 5 | 10.1.3.1 |

FIG. 28

| PORT ID | NODE ID | PORT NAME | LINE TYPE | TRANSMISSION RATE | IP ADDRESS | LENGTH OF SUBNET MASK |
|---|---|---|---|---|---|---|
| 10001 | 1 | Port:1 | Ethernet | 100Mbps | 10.1.1.1 | 24 |
| 10002 | 2 | Port:1 | Ethernet | 100Mbps | 10.1.2.2 | 24 |
| 10003 | 3 | Port:1 | Ethernet | 100Mbps | 10.1.3.1 | 24 |
| 10004 | 4 | Port:1 | Ethernet | 100Mbps | 10.10.1.1 | 24 |
| 10005 | 4 | Port:2 | Ethernet | 100Mbps | 10.1.1.254 | 24 |
| 10006 | 4 | Port:3 | Ethernet | 100Mbps | 10.2.1.1 | 24 |
| 10007 | 5 | Port:1 | Ethernet | 100Mbps | 10.2.2.1 | 24 |
| 10008 | 5 | Port:2 | Ethernet | 100Mbps | 10.2.1.2 | 24 |
| 10009 | 5 | Port:3 | Ethernet | 100Mbps | 10.2.3.1 | 24 |
| 10010 | 6 | Port:1 | Ethernet | 100Mbps | 10.2.4.1 | 24 |
| 10011 | 6 | Port:2 | Ethernet | 100Mbps | 10.2.2.2 | 24 |
| 10012 | 6 | Port:3 | Ethernet | 100Mbps | 10.2.5.1 | 24 |
| 10013 | 7 | Port:1 | Ethernet | 100Mbps | 10.2.6.1 | 24 |
| 10014 | 7 | Port:2 | Ethernet | 100Mbps | 10.2.3.2 | 24 |
| 10015 | 7 | Port:3 | Ethernet | 100Mbps | 10.2.5.2 | 24 |
| 10016 | 7 | Port:4 | Ethernet | 100Mbps | 10.2.7.1 | 24 |
| 10017 | 8 | Port:1 | Ethernet | 100Mbps | 10.2.8.1 | 24 |
| 10018 | 8 | Port:2 | Ethernet | 100Mbps | 10.2.4.2 | 24 |
| 10019 | 8 | Port:3 | Ethernet | 100Mbps | 10.2.7.2 | 24 |
| 10020 | 9 | Port:1 | Ethernet | 100Mbps | 10.2.9.1 | 24 |
| 10021 | 9 | Port:2 | Ethernet | 100Mbps | 10.2.8.2 | 24 |
| 10022 | 9 | Port:3 | Ethernet | 100Mbps | 10.2.10.1 | 24 |
| 10023 | 9 | Port:4 | Ethernet | 100Mbps | 10.1.3.254 | 24 |
| 10024 | 10 | Port:1 | Ethernet | 100Mbps | 10.2.9.2 | 24 |
| 10025 | 10 | Port:2 | Ethernet | 100Mbps | 10.2.10.2 | 24 |
| 10026 | 10 | Port:3 | Ethernet | 100Mbps | 10.1.2.254 | 24 |

FIG.29

| LINK ID | LINK NAME | PORT ID1 | PORT ID2 |
|---|---|---|---|
| 20001 | A-R1 | 10001 | 10004 |
| 20002 | B-R7 | 10002 | 10026 |
| 20003 | C-R6 | 10003 | 10023 |
| 20004 | R1-R2 | 10005 | 10007 |
| 20005 | R1-R3 | 10006 | 10010 |
| 20006 | R2-R5 | 10009 | 10017 |
| 20007 | R2-R4 | 10008 | 10013 |
| 20008 | R3-R4 | 10011 | 10014 |
| 20009 | R3-R6 | 10012 | 10020 |
| 20010 | R4-R5 | 10015 | 10018 |
| 20011 | R4-R6 | 10016 | 10021 |
| 20012 | R5-R7 | 10019 | 10024 |
| 20013 | R6-R7 | 10022 | 10025 |

_US 7,623,465 B2_

NETWORK MONITORING PROGRAM, NETWORK SYSTEM AND NETWORK MONITORING METHOD

BACKGROUND OF THE INVENTION

The present invention relates to a network system capable of monitoring a communication status within the system and to a network monitoring program employed for configuring this network system and to a network monitoring method for monitoring a communication status within a network system.

As known well, in a comparatively large-scale network system (in which computers, routers, etc. are connected to a network), some computers (normally, a single computer) monitor information about an operation status of each node within the system in order to immediately cope with the communication abnormality (refer to, e.g., Patent document 1). The information about the operation status of each node that is monitored in the existing network system enables, however, only judgment as to whether a physical fault occurs in each node or not. Therefore, the existing network system, if the communication abnormality (at the application level) occurs due to a lack of internal resources, etc. of the computer, requires a considerable period of time for troubleshooting a cause of this abnormality.

[Patent document 1] Japanese Patent Application Laid-Open Publication No. 2004-86522

SUMMARY OF THE INVENTION

Under such circumstance, it is an object of the present invention to provide a network monitoring program, a network system and a network monitoring method that are capable of easily, if a communication abnormality occurs at an application level, troubleshooting a cause of this abnormality.

To accomplish the above object, a network monitoring program executed on a computer within a network system including a plurality of monitoring target computers and a plurality of network devices for relaying TCP communications, makes the computer operate as a device comprising an operation status detecting function of detecting whether each of the plurality of network devices normally operates or not, a detection result displaying function of displaying a result of the detection by the operation status detecting function on a display, an abnormal phenomenon occurrence notifying message management function of receiving and managing an abnormal phenomenon occurrence notifying message sent by the each monitoring target computer when an occurrence frequency of the abnormal phenomenon in the on-performing TCP communications becomes larger than a specified value, and an occurred abnormal phenomenon presenting information display function of displaying, on the display, occurred abnormal phenomenon presenting information containing at least a piece of information indicating which monitoring target computer is a sender of the abnormal phenomenon occurrence notifying message with respect to every abnormal phenomenon occurrence notifying message managed by the abnormal phenomenon occurrence notifying message management function.

Namely, in the network system wherein the network monitoring program according to the present invention runs on a certain computer, if a trouble occurs in the TCP communication performed by an unspecified monitoring target computer (if the occurrence frequency of the abnormal phenomenon (such as discarding and retransmitting a packet) in the TCP communication becomes larger than the specified value), it follows that the occurred abnormal phenomenon presenting information making it recognizable that the trouble has occurred on the monitoring target computer, is displayed on the display. Further, this also makes it possible to check on the display whether each of the network devices operates normally or not, and hence the use of the network monitoring program according to the present invention enables, if the communication abnormality occurs at the application level, actualization of an environment where this abnormality can be easily troubleshot.

Note that on the occasion of actualizing (creating) the network monitoring program according to the present invention, the display for displaying the variety of information can be designed not to be connected directly to the computer on which the network monitoring program runs.

Moreover, in the network monitoring program according to the present invention, the abnormal phenomenon occurrence notifying message management function can be also created as a function of generating and managing, when the abnormal phenomenon occurrence notifying messages are sent within a predetermined period of time from the two monitoring target computers that transfer and receive the information through the TCP communications, an abnormal phenomenon occurrence notifying message into which these two abnormal phenomenon occurrence notifying messages are aggregated. When the network monitoring program of the present invention is designed in this way, a result is that the number of pieces of occurred abnormal phenomenon presenting information displayed on the display decreases (none of the occurred abnormal phenomenon presenting information about the respective abnormal phenomenon occurrence notifying messages received is displayed on the display), and therefore it is feasible to actualize the network system in which a network administrator can easily grasp a content of the fault occurred.

Further, a network system comprises: a plurality of network devices for relaying TCP communications; a plurality of monitoring target computers each including a communication function for performing TCP communications with the other monitoring target computer, and an abnormal phenomenon occurrence notifying message sending function of monitoring an occurrence frequency of an abnormal phenomenon in each session of TCP communication performed by the communication function and, when the occurrence frequency of the abnormal phenomenon in each session of TCP communication performed by the communication function becomes larger than a specified value, sending an abnormal phenomenon occurrence notifying message showing a purport that the abnormal phenomenon has occurred to the network monitoring device; and a network monitoring device including an operation status detecting function of detecting whether each of the plurality of network devices normally operates or not, a detection result display function of displaying a result of the detection by the operation status detecting function on the display, an abnormal phenomenon occurrence notifying message management function of managing the abnormal phenomenon occurrence notifying message sent therefrom, and an occurred abnormal phenomenon presenting information display function of displaying, on the display, occurred abnormal phenomenon presenting information containing at least a piece of information indicating which monitoring target computer is a sender of the abnormal phenomenon occurrence notifying message with respect to every abnormal phenomenon occurrence notifying message managed by the abnormal phenomenon occurrence notifying message management function.

Namely, the network system according to the present invention includes the device (network monitoring device) corresponding to the computer on which the network monitoring program of the present invention runs. Accordingly, the use of the present network system makes it possible to easily troubleshoot, even when the communication abnormality occurs at the application level, a cause for this abnormality.

The use of the network monitoring program and the network system according to the present invention makes it feasible to easily troubleshoot, even when the communication abnormality occurs on the monitoring target computer at the application level, the cause for this abnormality.

BRIEF DESCRIPTION OF THE DRAWINGS

FIG. 3 is an explanatory diagram of a communication status table provided in the monitoring target computer;

FIG. 4 is an explanatory diagram of a monitoring target designation information table provided on a TCP communication fault management unit within the monitoring target computer;

FIG. 9 is an explanatory diagram of a node information table;

FIG. 10 is an explanatory diagram of a fault information list screen displayed on a display of an operation terminal;

FIG. 15 is an explanatory diagram of a fault notifying message buffer provided in the TCP communication fault management unit in the network monitoring device;

FIG. 19 is an explanatory diagram of an operation of the TCP communication fault management unit;

FIG. 20 is an explanatory diagram of the operation of the TCP communication fault management unit;

FIG. 21 is an explanatory diagram of the operation of the TCP communication fault management unit;

FIG. 22 is an explanatory diagram of a fault information list screen displayed on the display of the operation terminal in the network system according to the second embodiment;

FIG. 23 is an explanatory diagram of the fault information list screen having a content corresponding to FIG. 22, which is displayed on the display of the operation terminal in the network system according to the first embodiment;

FIG. 28 is an explanatory diagram of a port information table;

FIG. 29 is an explanatory diagram of a link information table;

DETAILED DESCRIPTION OF THE PREFERRED EMBODIMENTS

First Embodiment

An in-depth description of a best mode for carrying out the present invention will hereinafter be made with reference to the drawings.

To start with, an outline of a network system according to the first embodiment of the present invention will be explained referring to FIG. 1.

Figure 1:
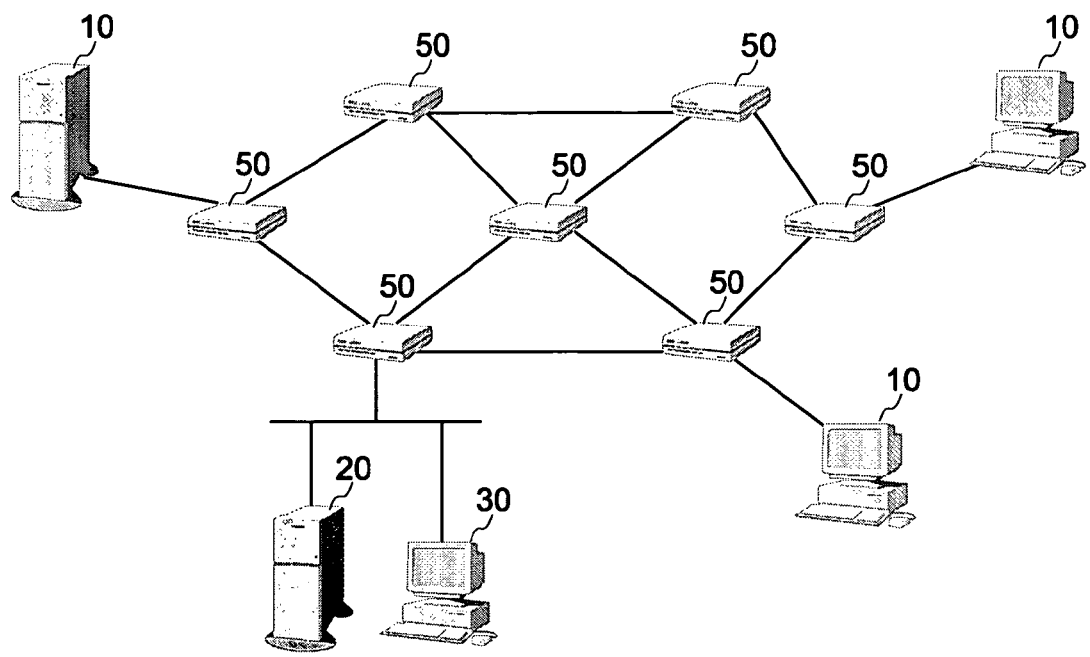
FIG. 1 is a view showing a whole architecture of a network system according to a first embodiment of the present invention.

As illustrated in FIG. 1, the network system according to the first embodiment of the present invention is configured by a plurality of monitoring target computers 10, a network monitoring device 20, an operation terminal 30 and a plurality of routers 50.

Each of the routers 50 (which corresponds to a network device according to the present invention) configuring the present network system is a device (router) having the same function, which is employed in a general IP network system. Each of the monitoring target computers 10 is a device constructed so that a computer implementing a TCP/IP (Transmission Control Protocol/Internet Protocol) communication function is installed with a program (that will be described in detail later on) for the monitoring target computer, which was developed for the present system.

The network monitoring device 20 includes a function of detecting physical faults (such as a node fault, a port fault, etc. of the monitoring target computers 10 and the routers 50) on communication routes, a function of detecting non-physical faults (such as an abnormal state in packet discard count, etc. in the monitoring target computer 10; which will hereinafter be termed a TCP communication fault) occurred in the monitoring target computer 10, and a function of displaying a result of detecting the variety of faults on a display of the operation terminal 30. Note that the operation terminal 30 represents a computer (to which the display is connected) functioning as a console of the network monitoring device 20. Further, the network monitoring device 20 is a device actualized by installing a network monitoring program developed for the present system into the computer.

Next, an architecture and an operation (a function of a program designed for the monitoring target computer) of the monitoring target computer 10, will be explained with reference to FIGS. 2 through 6.

Figure 2:
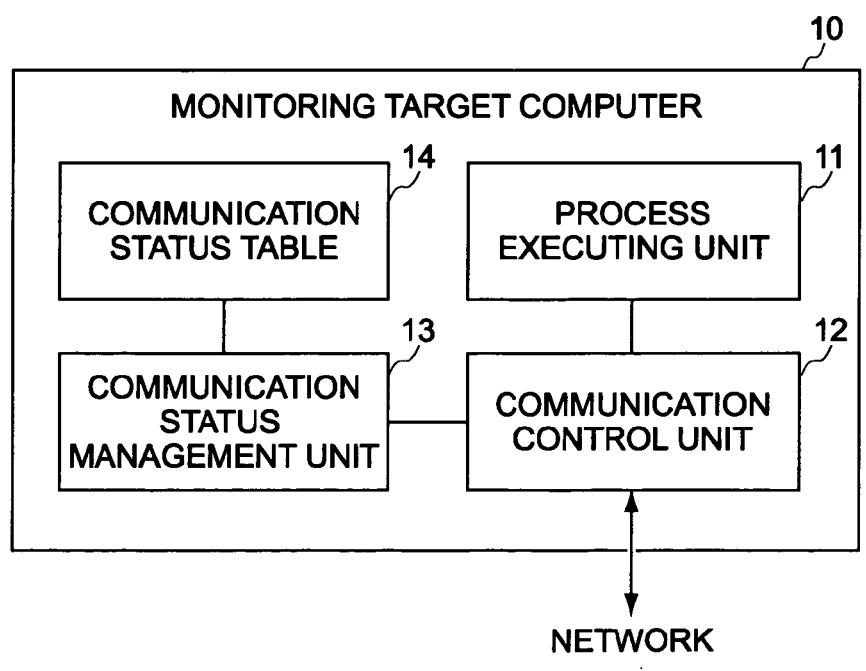
FIG. 2 is a functional block diagram of a monitoring target computer partly configuring the network system according to the first embodiment.

The designed-for-the-monitoring-target-computer program runs on the monitoring target computer 10 (installed with a self-program) to make the computer 10 operate as a device having the architecture shown in FIG. 2, i.e., as the device including a process executing unit 11, a communication control unit 12, a communication status management unit 13 and a communication status table 14.

The communication control unit 12 is a component for controlling TCP/IP communications (which actually transmits and receives packets). This communication control unit 12 has a function of managing a TCP retransmission count and a packet discard count for every TCP communication specified by a self-side IP address, a partner-side IP address, a self-side port number and a partner-side port number. Further, the communication control unit 12 also has a function of outputting, to an external component (the communication status management unit 13), information consisting of the self-side IP address, the partner-side IP address, the self-side port number, the partner-side port number, the TCP retransmission count and the packet discard count (which will hereinafter be referred to as communication status data).

The process executing unit 11 is a component for executing a variety of processes that involve employing the communication control unit 12 (which is the component operating based on an application program, etc. for performing the TCP/IP communications). Note that this process executing unit 11 and the aforementioned communication control unit 12 are the components originally provided in the monitoring target computer 10 (the components that are not those occurred by installing the designed-for-the-monitoring-target-computer program).

The communication status table 14 is generated within the monitoring target computer 10 by installing the designed-for-the-monitoring-target-computer program. This communication status table 14 has a structure capable of, as schematically shown in FIG. 3, storing plural records of data each consisting of No. (communication number), a self-side IP address, a partner-side IP address, a self-side port number, a partner-side port number, a TCP retransmission count and a packet discard count. Each record of data (consisting of No., the self-side IP address and so on) stored in this communication status table 14 is also termed the communication status data.

The communication status management unit 13 (FIG. 2) is also a component occurred by installing the designed-for-the-monitoring-target-computer program.

This communication status management unit 13 includes a monitoring target designation information table having a structure shown in FIG. 4. This monitoring target designation information table is, though a detailed explanation thereof will be given later on, a table in which pieces of information are set in the case of limiting the monitoring target TCP communication.

Figure 5:
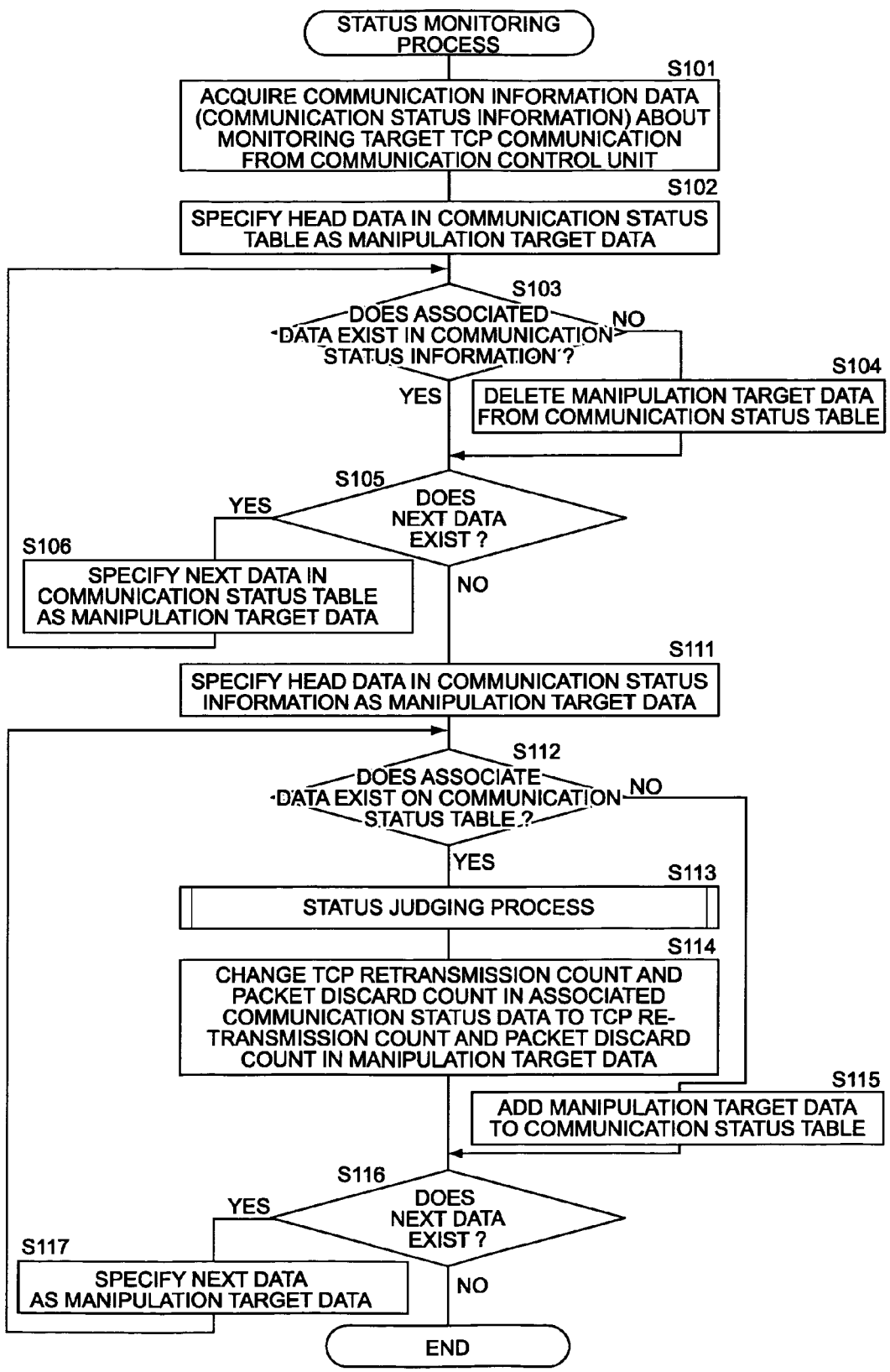
FIG. 5 is a flowchart of a status monitoring process executed on the monitoring target computer.
Figure 6:
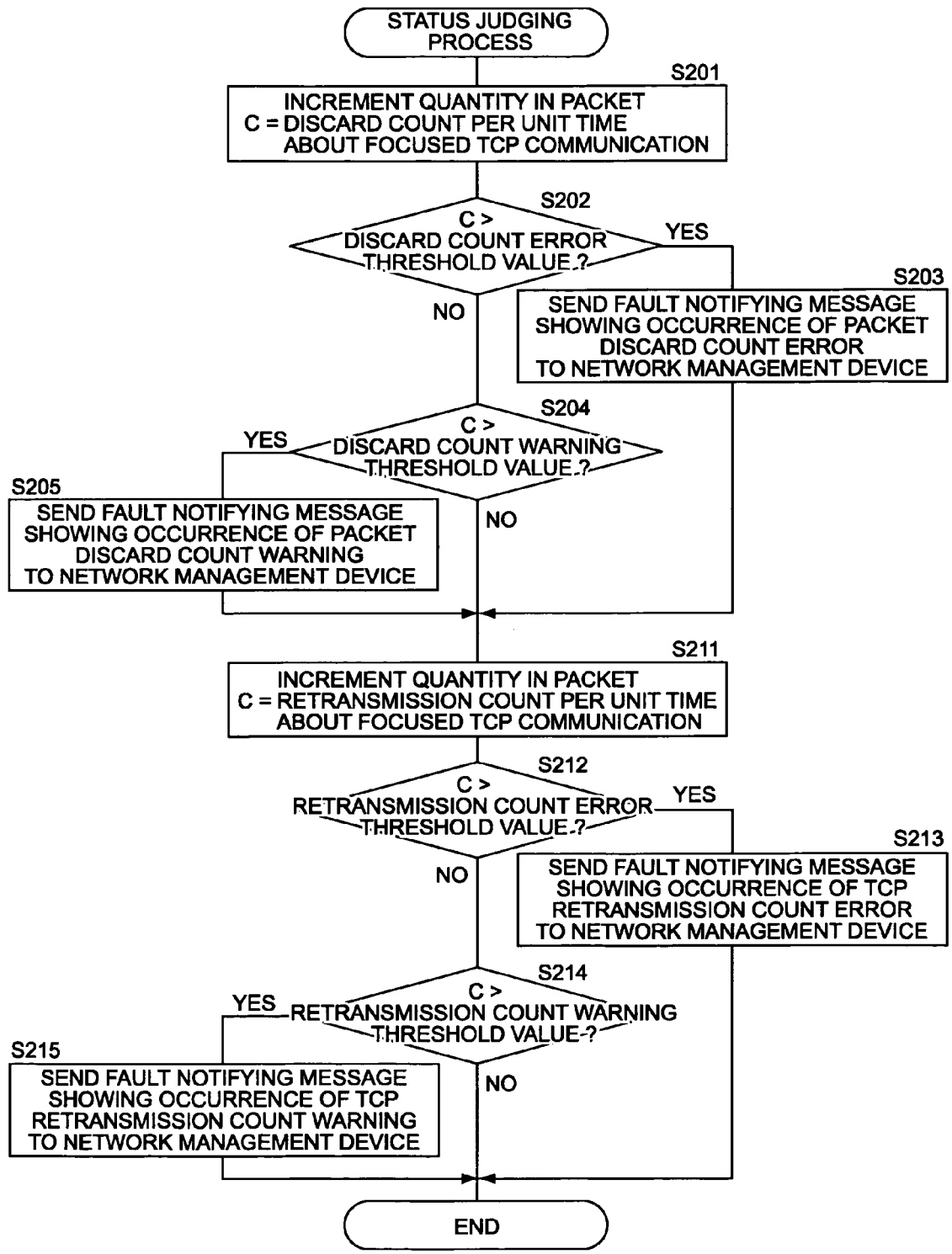
FIG. 6 is a flowchart of a status judging process executed in the status monitoring process.

Then, the communication status management unit 13 is a component that periodically executes a status monitoring process in a procedure shown in FIG. 5.

To be specific, the communication status management unit 13 starts the status monitoring process for every elapse of a predetermined period of time (e.g., one minute). Then, the communication status management unit 13 starting the status monitoring process at first acquires the communication status data about each monitoring target TCP communication from the communication control unit 12 (step S101). Herein, "each monitoring target TCP communication" connotes a TCP communication that meets any one of conditions set in the monitoring target designation information table (see FIG. 4) (if the data in the monitoring target designation information table are null, all the TCP communications are defined as the monitoring target communications). Note that a symbol "*" shown in the monitoring target designation information table represents "any". Namely, if the contents of the monitoring target designation information table are those shown in FIG. 4, the communication status management unit 13 acquires, from the communication control unit 12 in step S101, every record of communication status data about the TCP communication (which is a HTTP (HyperText Transfer Protocol) communication with the self-communication) having such a record that a partner-side IP address is "10.1.3.1" and a self-side port number is "80".

In the following discussion, for convenience's sake in explanation, information consisting of some records of communication status data acquired by the process in step S101 is referred to as communication status information. Further, a record of pieces of data such as the self-side IP address, the partner-side IP address, the self-side port number and the partner-side port number, is referred to as session identifying data.

The communication status management unit 13 finishing the process in step S101 executes a process (steps S102 through S106) for setting the communication status table 14 (see FIG. 3) into a state of being stored with none of the communication status data about an already-disconnected communication session.

Specifically, the communication status management unit 13, to begin with, specifies the data stored in the head of the communication status table 14 as manipulation target data (step S102). Subsequently, the communication status management unit 13 judges whether or not the communication status information contains the communication status data (associated communication status data in the Figure) associated with the manipulation target data (step S103). Note that "the communication status data associated with the manipulation target data" is the communication status data containing the same session identifying data as the session identifying data (the self-side IP address, the partner-side IP address, the self-side port number and the partner-side port number) contained in the manipulation target data.

If the communication status information contains the communication status data associated with the manipulation target data (step S103; YES), the communication status management unit 13 judges whether or not a next record of data exists on the communication status table 14 (step S105). Whereas if the communication status information does not contain the communication status data associated with the manipulation target data (step S103; NO), the communication status management unit 13 executes a process of deleting the manipulation target data from the communication status table 14 (step S104), and thereafter judges whether or not the next record of data exists on the communication status table 14 (step S105).

Then, the communication status management unit 13, if the next data exists (step S105; YES), specifies the next data as the manipulation target data (step S106), and thereafter starts processes from step S103 onward.

The communication status management unit 13, when finishing the process with respect to the communication status data on the communication status table 14 (step S105; NO), exits a processing loop of steps S103 through S106. Then, the communication status management unit 13 specifies the head data (the communication status data contained in the head of the communication status information) of the communication status information as the manipulation target data (step S111).

Thereafter, the communication status management unit 13 judges whether or not the communication status table 14 is stored with the communication status data (the communication status data of which the session identifying data is coincident with the manipulation target data: the associated the communication status data in the Figure) associated with the manipulation target data (step S112).

If the communication status table 14 is not stored with the communication status data associated with the manipulation target data (step S112; NO), the communication status management unit 13 adds the manipulation target data to the communication status table 14 (step S115), and thereafter judges whether or not the communication status information contains a next record of data (step S116). Then, the communication status management unit 13, if the next data exists (step S116; YES), after specifying the next data as the manipulation target data (step S117), starts processes from step S112 onward.

Whereas if the communication status table 14 is stored with the communication status data associated with the manipulation target data (step S112; YES), the communication status management unit 13 executes a status judgment process in a procedure shown in FIG. 6.

Namely, the communication status management unit 13, to start with, calculates an increment quantity in the packet discard count per unit time with respect to a focused TCP communication, and stores a result of the calculation as a calculation result "C" (step S201). Herein, the focused TCP communication connotes a TCP communication of which a status is shown by the manipulation target data. Note that a specific processing content in step S201 is that a value C to be stored is calculated by ([packet discard count in the manipulation target data]−[packet discard count in the communication status data associated with the manipulation target data])/[status monitoring process execution period].

The communication status management unit 13 finishing the process in step S201 judges whether or not the C's value exceeds a preset discard count error threshold value (e.g., 10 [times/min]) at step S202.

Figures 7, 8:
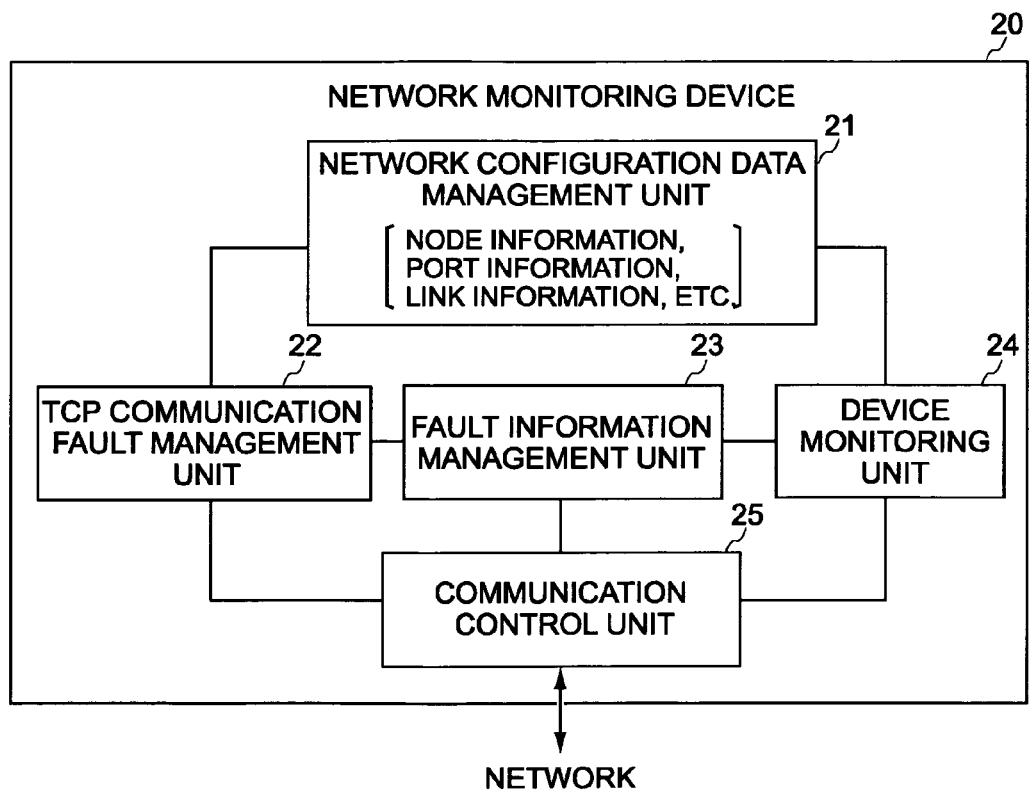
FIG. 7 is an explanatory diagram of a fault notifying message outputted by the TCP communication fault management unit within the monitoring target computer.
FIG. 8 is a functional block diagram of a network monitoring device partly configuring the network system according to the first embodiment.

Then, the communication status management unit 13, if the C's value exceeds the discard count error threshold value (step S202; YES), sends a fault notifying message indicating occurrence of a packet discard count error to the network monitoring device 20 (step S203). Note that the fault notifying message (corresponding to an abnormal phenomenon occurrence notifying message according to the present invention) transmitted in the process in this step and a process in step S205, etc. that will be mentioned later on, as shown in FIG. 7, contains a self-side IP address, a partner-side IP address, a self-side port number, a partner-side port number, and a fault content message number (10010: packet discard count error, 10011: packet discard count warning, 10020: TCP retransmission count error, 10021: TCP retransmission count warning) indicating contents of the fault (error/warning) occurred.

While on the other hand, if the C's value is equal to or smaller than the discard count error threshold value (step S202; NO), the communication status management status 13 judges whether or not the C's value exceeds a predetermined packet discard count warning threshold value (e.g., 5 [times/min]) (step S204).

Then, the communication status management unit 13, if the C's value exceeds the discard count warning threshold value (step S204; YES), sends, to the network monitoring device 20, a fault notifying message (in which a fault content message number is 10011) indicating occurrence of packet discard count warning (step S205).

The communication status management unit 13, which has executed the process in step S203 or S205 and judged that the C's value is equal to or smaller than the discard count warning threshold value (step S204; NO), calculates an increment quantity in the TCP retransmission count per unit time with respect to the focused TCP communication, and stores a result of the calculation as a value "C" (step S211). Namely, in this step S211, the communication status management unit 13 executes a process of calculating the value C by ([TCP retransmission count in the manipulation target data]−[TCP retransmission count in the communication status data associated with the manipulation target data])/[status monitoring process execution period], and storing the value C.

Thereafter, the communication status management unit 13 judges whether or not the C's value exceeds a predetermined TCP retransmission count error threshold value (e.g., 2 (twice) [times/min]) (step S212). Then, if the C's value exceeds the TCP retransmission count error threshold value (step S212; YES), the communication status management unit 13 sends to the network monitoring device 20 a fault notifying message (in which a fault content message number is 10020) indicating occurrence of a TCP retransmission count error (step S213), and thereafter finishes this status judgment process.

Further, if the C's value is equal to or smaller than the TCP retransmission count error threshold value (step S212; NO), the communication status management unit 13 judges whether or not the C's value exceeds a TCP retransmission count warning threshold value (e.g., 1 (once) [times/min]) (step S214). Then, the communication status management unit 13, if the C's value exceeds the TCP retransmission count warning threshold value (step S214; YES), sends to the network monitoring device 20 a fault notifying message (in which a fault content message number is 10021) indicating occurrence of the TCP retransmission count warning (step S215), and thereafter terminates this status judgment process. Moreover, whereas if the C's value is equal to or smaller than the TCP retransmission count warning threshold value (step S214; NO), the communication status management unit 13 terminates this status judgment process without sending the fault notifying message about the TCP retransmission count.

The communication status management unit 13 finishing the status judgment process (FIG. 5: step S113) changes the TCP retransmission count and the packet discard count in the associated communication status data in the communication status table 14 to a TCP retransmission count and a packet discard count in the manipulation target data (step S114), and thereafter judges whether or not a next record of data exists in the communication status information (step S116). Then, the communication status management unit 13, if the next data exists (step S116; YES), specifies the next data as the manipulation target data (step S117), and thereafter starts processes from step S112 onward. Whereas if the next data does not exist (step S116; NO), the communication status management unit 13 finishes this status monitoring process, and comes to a standby status for an elapse of a predetermined period of time (set as the status monitoring process execution period).

Given next are explanations of configurations and operations of the network monitoring device 20 and the operation terminal 30.

FIG. 8 shows a functional block diagram of the network monitoring device 20. As shown in FIG. 8, the network monitoring device 20 is a computer functioning as a device including a network configuration data management unit 21, a TCP communication fault management unit 22, a fault information management unit 23, a device monitoring unit 24 and a communication control unit 25.

The communication control unit 25 provided in this network monitoring device 20 is a component that controls the communications based on a stack of various protocols (the component that actually transmits and receives the packets). The network configuration data management unit 21 is a component that manages various items of information (node information, port information, link information, etc.) about the architecture of the network system. The network configuration data management unit 21 is the component that manages the node information (corresponding to one row (one record) of information in FIG. 9) about each node (the monitoring target computer 10, the router 50) by way of a node information table having a structure shown in FIG. 9.

Figure 11:
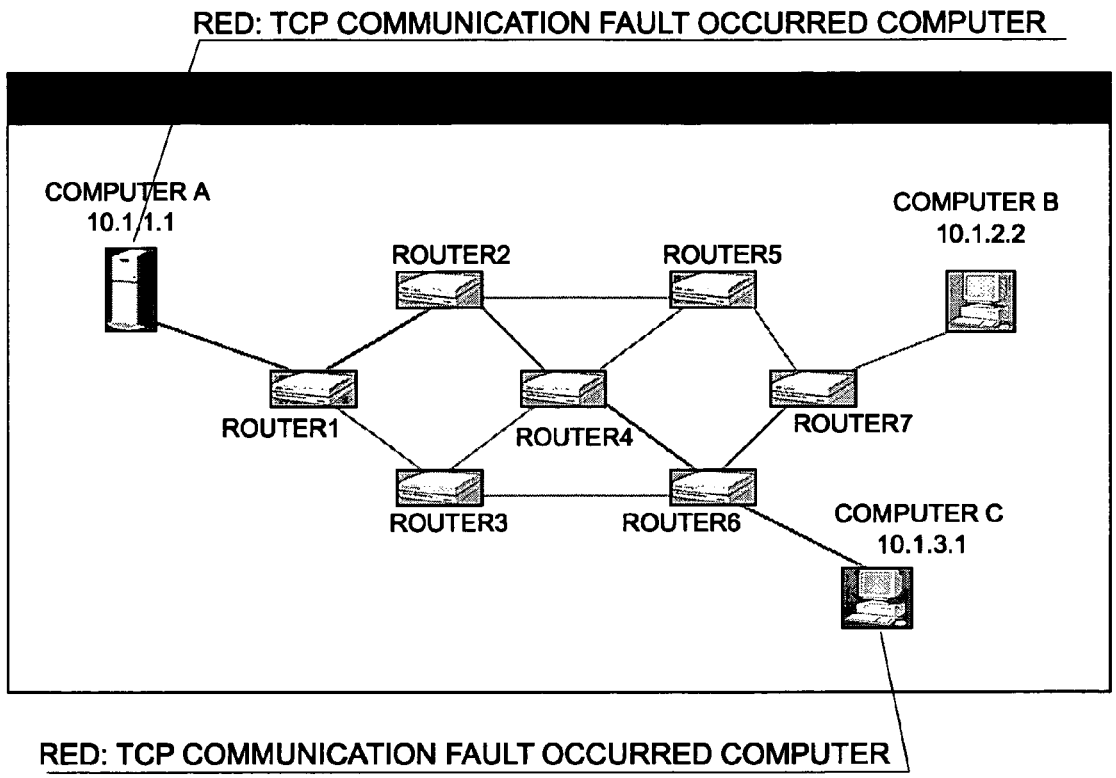
FIG. 11 is an explanatory diagram of a network configuration view screen displayed on the display of the operation terminal.

The fault information management unit 23 (FIG. 8) is a component having a function of managing fault notifying data (its detailed explanation will be given later on) which the device monitoring unit 24 and the TCP communication fault management unit 22 notify of, and a function of displaying a fault information list screen as shown in FIG. 10 and a network configuration view screen (where the monitoring target computer 10 exhibiting occurrence of the TCP communication fault is indicated by an icon against a reddish background) as shown in FIG. 11 on the display of the operation terminal 30 in response to a variety of requests given from the operation terminal 30.

The device monitoring unit 24 is a component that monitors the occurrence of the physical faults (monitored by the general type of network monitoring device) such as the node fault, the node fault, etc. by employing the communication control unit 25. Further, the device monitoring unit 24 is the component that, when detecting occurrence of a certain physical fault, generates fault notifying data showing a type, etc. of this physical fault, and outputs the thus-generated notifying data to the fault information management unit 23.

The TCP communication fault management unit 22 is a component that processes the fault notifying message (received by the communication control unit 25) sent from the monitoring target computer 10.

Figure 12:
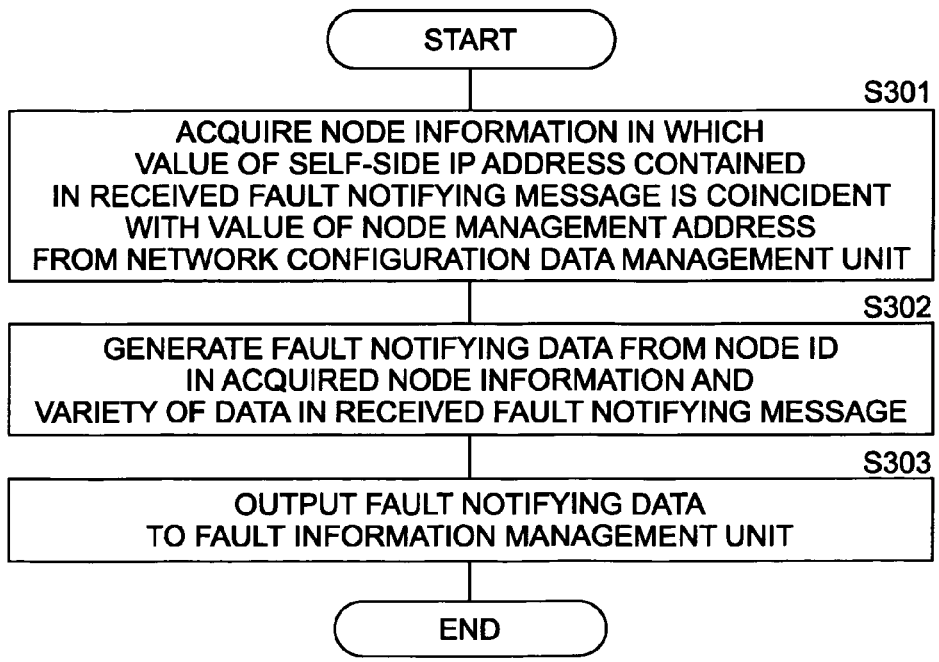
FIG. 12 is a flowchart of a process executed by the TCP communication fault management unit when a fault notifying message is sent.

The TCP communication fault management unit 22 is a component that executes processes in a procedure shown in FIG. 12 when the fault notifying message is transmitted thereto (when received by the communication control unit 25).

Figures 13, 14:
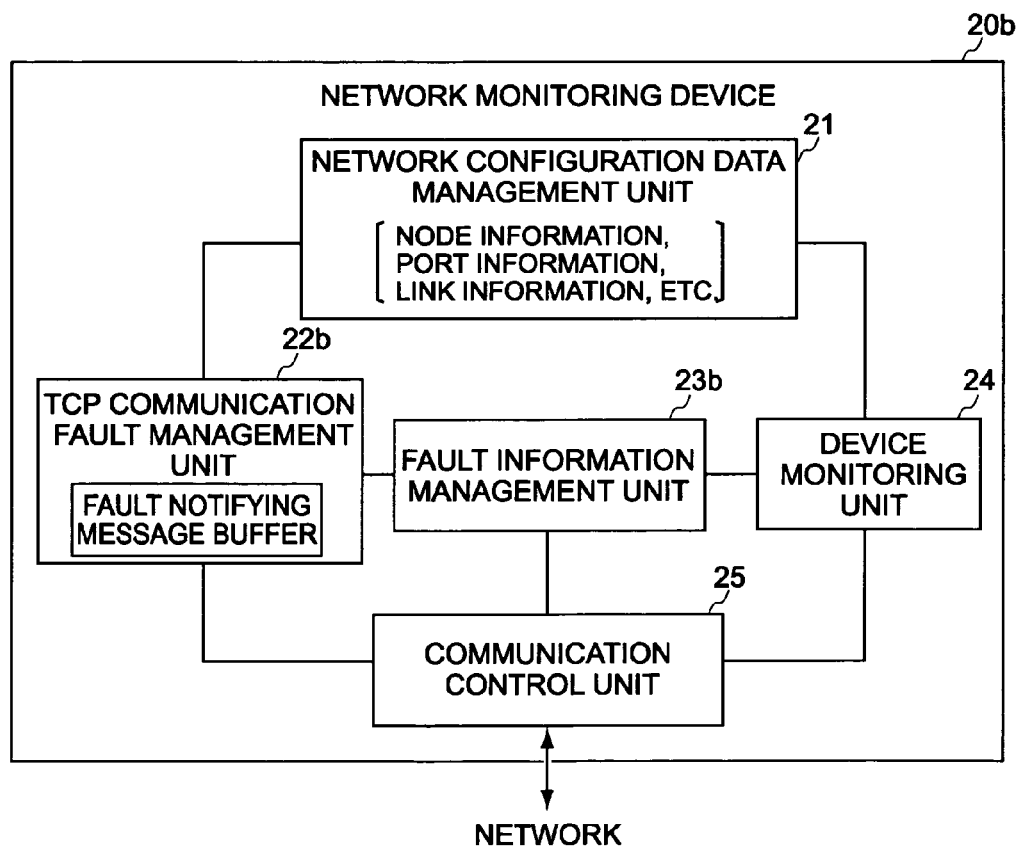
FIG. 13 is an explanatory diagram of fault notifying data outputted by the TCP communication fault management unit.
FIG. 14 is a functional block diagram of a network monitoring device partly configuring a network system according to a second embodiment.

To be specific, when the fault notifying message is transmitted thereto, the TCP communication fault management unit 22 at first acquires, from the network configuration data management unit 21, the node information (see FIG. 9) of which the node management address value is coincident with the self-side IP address value contained in the fault notifying message (step S301). Subsequently, the TCP communication fault management unit 22 generates the fault notifying data having a content as shown in FIG. 13 from a node ID in the acquired node information, various items of data in the fault notifying message and receiving time of the fault notifying message (step S302). Namely, the TCP communication fault management unit 22 generates the fault notifying data in such a way that fault notifying message receiving time is set in a "fault occurrence time" field, a TCP communication fault is set in a "fault type" field, a node ID in the acquired node information is set in an "object ID" field, a fault content message number contained in the fault notifying message is set in a "fault content message number" field, and a session identifying data contained in the fault notifying message is set in a "additional information" field, respectively. Note that the fault notifying data generated by the fault information management unit 23 are organized in the same format as that of the fault notifying data shown in FIG. 13.

The TCP communication fault management unit 22, which has generated the fault notifying data, outputs the fault notifying data to the fault information management unit 23 (step S303), and then finishes the processes in FIG. 12.

Then, the fault information management unit 23 is a component that executes the process of displaying the fault information list screen (FIG. 10) and the network configuration view screen (FIG. 11) on the display of the operation terminal 30 by use of the fault notifying data (sent from the TCP communication fault management unit 22) outputted by the process in FIG. 12, the fault notifying data given from the device monitoring unit 24 and the information managed by the network configuration data management unit 21.

As discussed above, the network system according to the first embodiment of the present invention is capable of having the operation done, if a trouble occurs in the TCP communication performed by a certain monitoring target computer 50 (if the packet discard count and the retransmission count in the TCP communication exceed the predetermined values (such as the discard count warning threshold value, etc.)), in the state of displaying the information (FIGS. 10 and 11), from which the trouble occurred on the monitoring target computer 50 can be recognized, on the display of the operation terminal 30. Further, the network system according to the first embodiment also has the functions (the functions of the device monitoring unit 24 and of the fault information management unit 25) of detecting whether each router 50 normally operates or not and displaying the result of this detection on the display of the operation terminal 30. Accordingly, with this network system utilized, if the communication abnormality even at an application level occurs on the monitoring target computer 10, a cause for this abnormality occurred can be easily troubleshot.

Second Embodiment

A network system according to a second embodiment of the present invention has basically the same architecture of the network system (FIG. 1) according to the first embodiment. The network system according to the second embodiment involves using, however, as a substitute for the network monitoring device 20, a network monitoring device 20b having a construction shown in FIG. 14.

To be specific, the network monitoring device 20b used in the network system according to the second embodiment includes a network configuration data management unit 21, a TCP communication fault management unit 22b, a fault information management unit 23b, a device monitoring unit 24 and a communication control unit 25.

The network configuration data management unit 21, the device monitoring unit 24 and the communication control unit 25 provided in this network monitoring device 20b are the components given the same designations as those of the components provided in the network monitoring device 20.

The TCP communication fault management unit 22b is, as in the case of the TCP communication fault management unit 22, a component that processes the fault notifying message (see FIG. 7) sent from each monitoring target computer 10.

Figure 16:
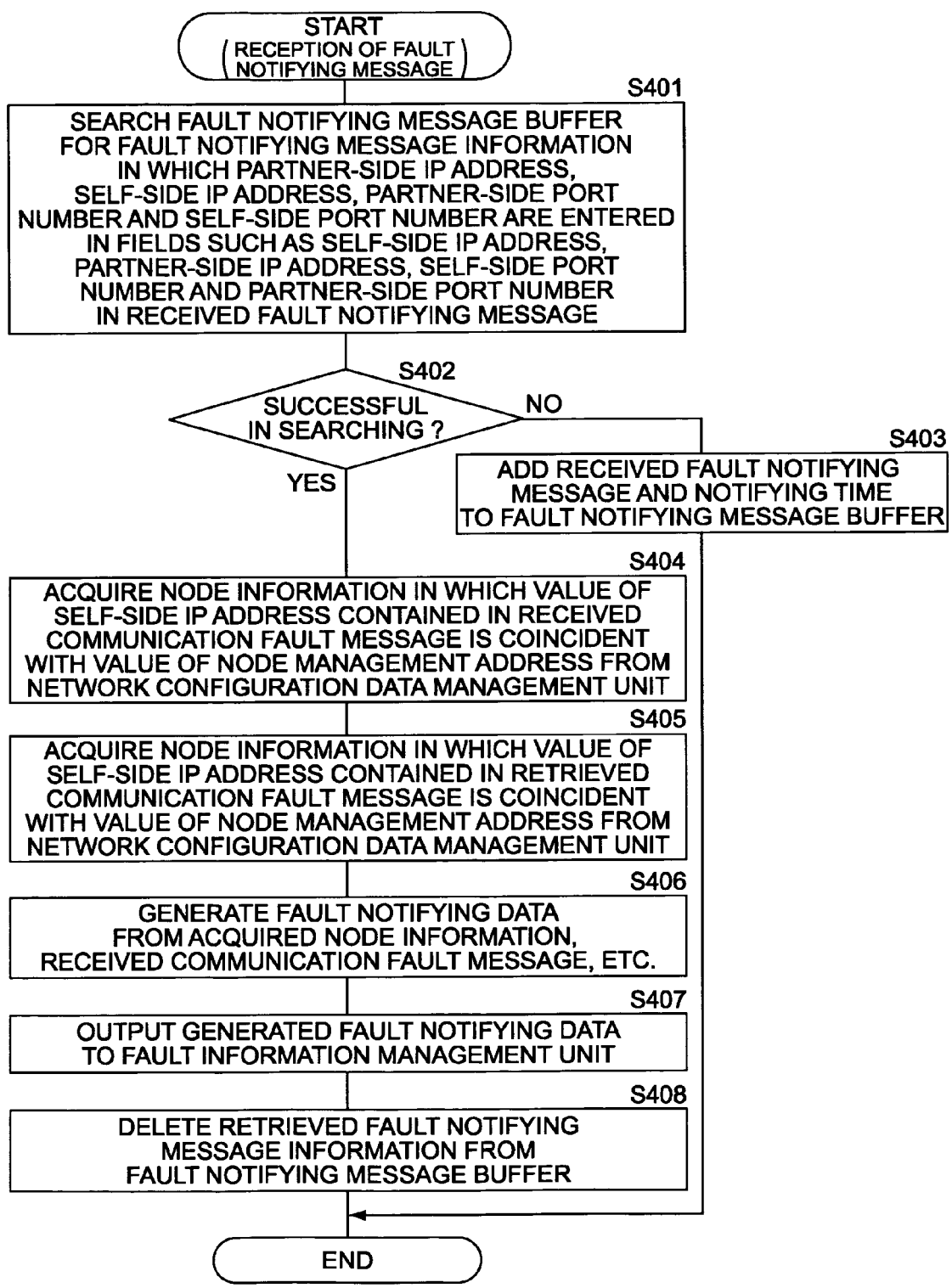
FIG. 16 is a flowchart showing an operating procedure of the TCP communication fault management unit when receiving the fault notifying message.

The TCP communication fault management unit 22b is, however, a component that executes processes in a procedure shown in FIG. 16 when the communication control unit 25 receives a fault notifying message, and is also a component including a fault notifying message buffer (table) having a structure shown in FIG. 15.

More specifically, the TCP communication fault management unit 22b includes the fault notifying message buffer (FIG. 15) capable of storing plural records of information (which will hereinafter be referred to as fault notifying message information) each consisting of a fault notifying message (see FIG. 7) and notifying time (fault notifying message receiving time).

Then, the TCP communication fault management unit 22b, when the communication control unit 25 receives the fault notifying message, as shown in FIG. 16, at first searches the fault notifying message buffer for the fault notifying message information in which a partner-side IP address (value), a self-side IP address (value), a partner-side port number (value) and a self-side port number (value) are entered in the fields such as the self-side IP address, the partner-side IP address, the self-side port number and the partner-side port number in this fault notifying message (which will hereinafter be called a reception fault notifying message) (step S401).

In the case of failing to search for this fault notifying message information (step S402: NO), the TCP communication fault management unit 22b adds the fault notifying message information consisting of the reception fault notifying message and the notifying time (the present time) to the fault notifying message buffer (step S403). Then, the TCP communication fault management unit 22b finishes the processes in FIG. 16.

While on the other hand, if successful in searching for the fault notifying message information (step S402; YES), the TCP communication fault management unit 22b executes a process of acquiring, from the network configuration data management unit 21, the node information (see FIG. 9) in which a value of the self-side IP address contained in the reception fault notifying message is coincident with a value of the node management address (step S404), and a process of acquiring, from the network configuration data management unit 21, the node information in which a value of the self-side IP address contained in the fault notifying message information retrieved from the fault notifying message buffer is coincident with a value of the node management address (step S405).

Figure 17:
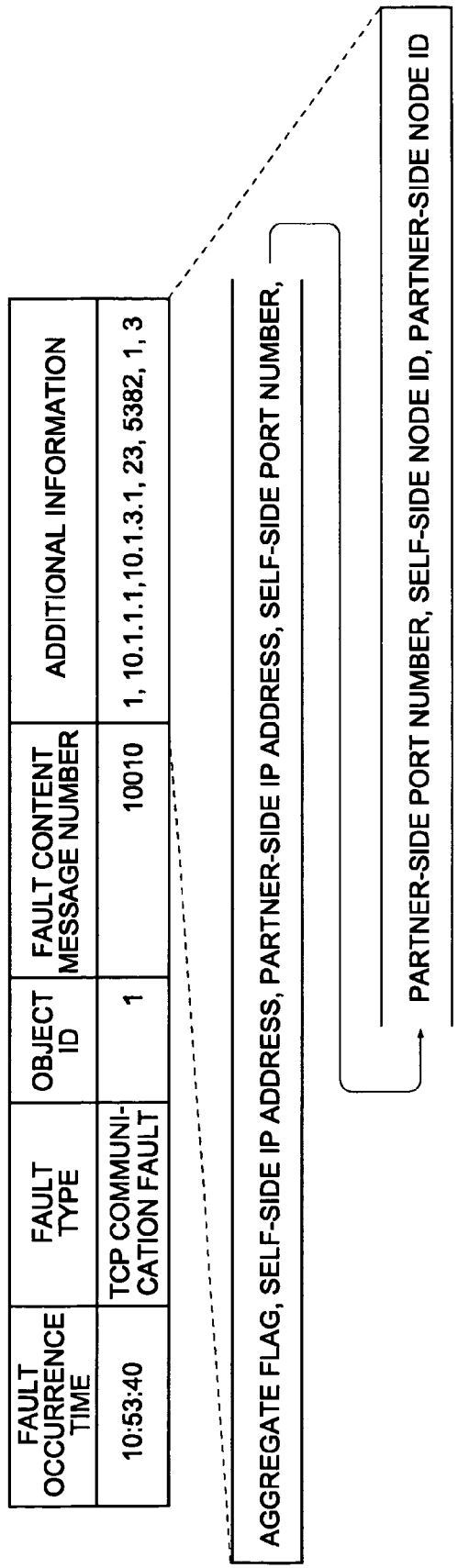
FIG. 17 is an explanatory diagram of the fault notifying data outputted by the TCP communication fault management unit.

Subsequently, the TCP communication fault management unit 22b generates the fault notifying data having a structure as shown in FIG. 17 on the basis of two sets of node information acquired from the network configuration data management unit 21 and the reception fault notifying message as well (step S406). To be more specific, the TCP communication fault management unit 22b generates the fault notifying data having the same basic structure as that of the fault notifying data (see FIG. 13) generated by the TCP communication fault management unit 22, wherein an aggregate flag ("1"

is set in this case), a self-side IP address, a partner-side IP address, a self-side port number, a partner-side port number, a self-side ID and a partner-side ID are arranged in this sequence as pieces of additional information. Note that aggregate flag is information for indicating by use of "1" or "0" (I/O) which data, the data (into which two fault notifying messages are aggregated) generated by the process in FIG. 16 or the data (generated from one fault notifying message) generated by a fault notifying data output process that will be explained later on, the fault notifying data is coincident with.

Then, the TCP communication fault management unit 22b, which has generated the fault notifying data, executes a process of outputting the fault notifying data to the fault information management unit 23b (step S407) and a process of deleting the retrieved fault notifying data from the fault notifying message buffer (step S408), and thereafter finishes the processes in FIG. 16.

Figure 18:
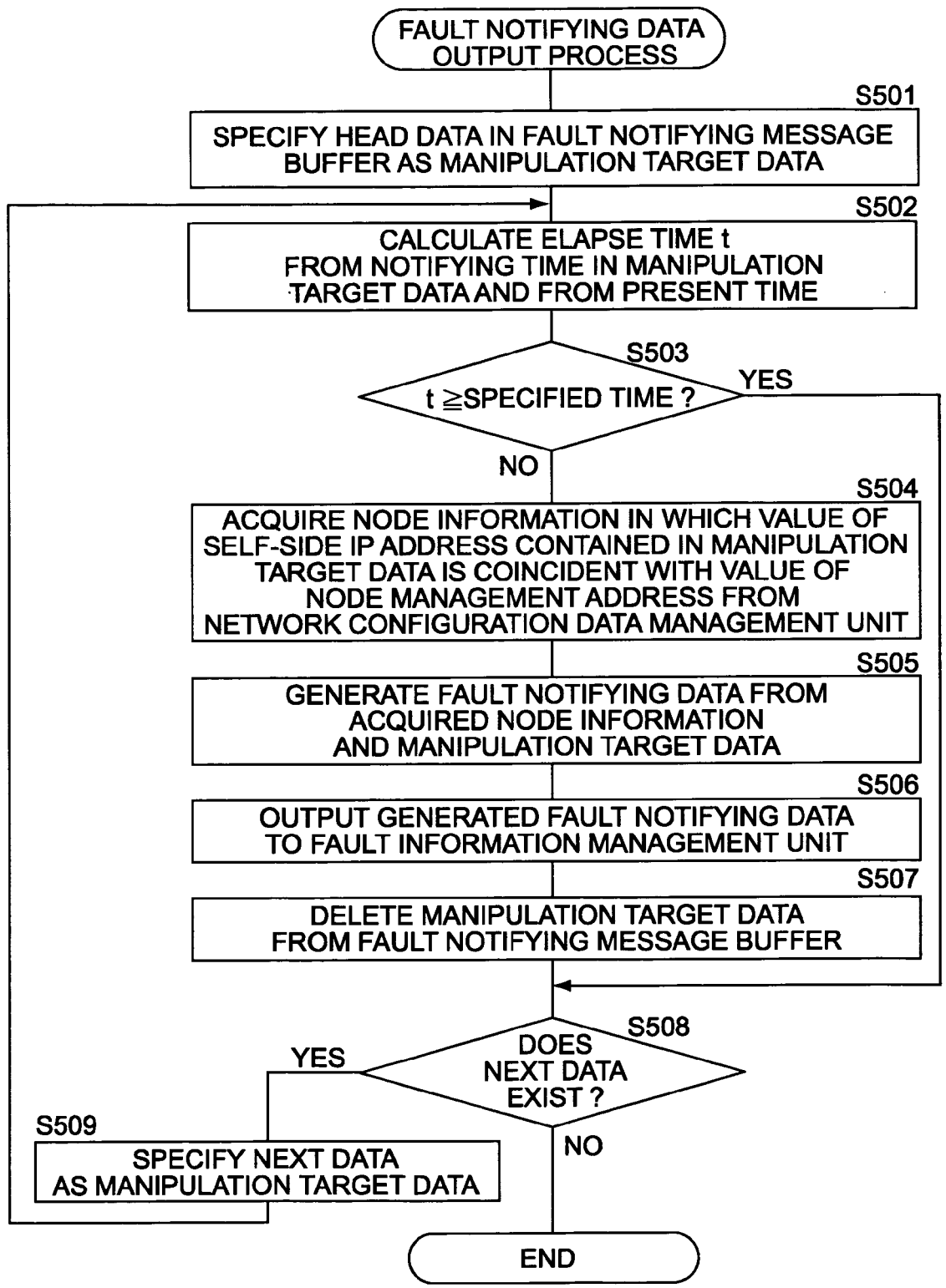
FIG. 18 is a flowchart of fault notifying data output process periodically executed by the TCP communication fault management unit.

Further, the TCP communication fault management unit 22b is a component that periodically executes a fault notifying data output process in a procedure shown in FIG. 18.

To be specific, the TCP communication fault management unit 22b starts this fault notifying data output process each time a predetermined period of time (e.g., 1 min) elapses. Then, the TCP communication fault management unit 22b, which has started the fault notifying data output process, at first specifies, as manipulation target data, the head data (the fault notifying message information stored in the head of the fault notifying message buffer) on the fault notifying message buffer (see FIG. 15) (step S501). Subsequently, the TCP communication fault management unit 22b calculates elapse time t since the receiving time of the fault notifying message serving as a basis of the fault notifying message information from the notifying time contained in the manipulation target data and from the present time (step S502).

Then, the TCP communication fault management unit 22b judges whether or not a calculated value of t is equal to or smaller than the predetermined specified time (e.g., 1 min) (step S503). If equal to or smaller than the value t (step S503; YES), the TCP communication fault management unit 22b judges whether or not a next record of data exists in the fault notifying message buffer (step S508).

Whereas if the value t exceeds the specified time (step S503; No), the TCP communication fault management unit 22b acquires, from the network configuration data management unit 21, the node information (see FIG. 9) in which the value of the self-side IP address contained in the manipulation target data is coincident with the value of the node management address (step S504). Subsequently, the TCP communication fault management unit 22b generates such fault notifying data (see FIG. 17) that "0" is set in the aggregate flag in the additional information on the basis of the node information acquired from the network configuration data management unit 21 and the manipulation target data as well (step S505).

Thereafter, the TCP communication fault management unit 22b executes a process of outputting the thus-generated fault notifying data to the fault information management unit 23b (step S506), and a process of deleting the manipulation target data from the fault notifying message buffer (step S507).

Then, the TCP communication fault management unit 22b judges whether or not a next record of data exists on the fault notifying message buffer (step S508). If the next data exists (step S508; YES), the TCP communication fault management unit 22b, after specifying the next data as the manipulation target data (step S509), starts processes from step S502 onward. Further, if the next data does not exist on the fault notifying message buffer (step S508; NO), the TCP communication fault management unit 22b terminates this fault notifying data output process, and comes to a standby status for an elapse of the predetermined time (the time set as a fault notifying data output process execution period) and for the reception of the fault notifying message.

In short, the TCP communication fault management unit 22b provided in the network monitoring device 20b according to the second embodiment is a component that operates as below.

For instance, under such a state that the contents of the fault notifying message buffer are those as shown in FIG. 19(A), there is considered a case in which the communication control unit 25 receives the fault notifying message having contents shown in FIG. 20. Incidentally, an assumption is that the receiving time of the fault notifying message is "10:54:10".

In this case, the fault notifying message buffer is stored with none of such fault notifying message information that the self-side/partner-side IP addresses and port numbers are reversed to those of the received fault notifying message, and hence the TCP communication fault management unit 22b executes a process in step S403 (FIG. 16). Accordingly, the fault notifying message buffer comes to have contents shown in FIG. 19(B).

Then, under this state, when receiving the fault notifying message having contents shown in FIG. 21, the fault notifying message buffer is stored with the fault notifying message information in which the self-side/partner-side IP addresses and port numbers are reversed to those of this fault notifying message, and therefore the TCP communication fault management unit 22b executes the processes in steps S404 through S407. Accordingly, the fault notifying data as shown in FIG. 18 are outputted to the communication management unit 22b, and it follows that the contents of the fault notifying message buffer are changed into those shown in FIG. 19(C).

Then, the TCP communication fault management unit 22b is a component that periodically executes the fault notifying data output process (FIG. 18). Therefore, if a certain period of time elapses without any reception of the fault notifying message after the contents of the fault notifying message buffer have been changed into those shown in FIG. 19(C), the fault notifying data output process is executed, and it follows that the fault notifying data having the contents corresponding to the fault notifying message information, etc. shown in FIG. 19(C) are outputted to the communication fault management unit 22b. Moreover, the contents of the fault notifying message buffer are changed into those shown in FIG. 19(D).

Then, the fault information management unit 23b provided in the network monitoring device 20b according to the second embodiment is a component as an improved version of the fault information management unit 23 so as to be capable of displaying the fault information list screen as shown in FIG. 22 on the display of the operation terminal 30 on the basis of the fault notifying data having the aforementioned structure that have been given from the TCP fault information management unit 22b.

The network system according to the second embodiment involves employing the network monitoring device 20b that operates as described above. Then, in the network system according to the first embodiment, if the TCP communication fault (the packet discard count error) occurs on a computer A and a computer C (if becoming a state corresponding to the state where the fault information list screen shown in FIG. 22 is displayed on the display of the operation terminal 30 in the network system according to the second embodiment), a fault information list screen shown in FIG. 23 is displayed. It is therefore possible to grasp what type of TCP communication fault occurs in the system by utilizing the network system according to the second embodiment more easily than in the case of utilizing the network system according to the first embodiment.

Third Embodiment

Figure 24:
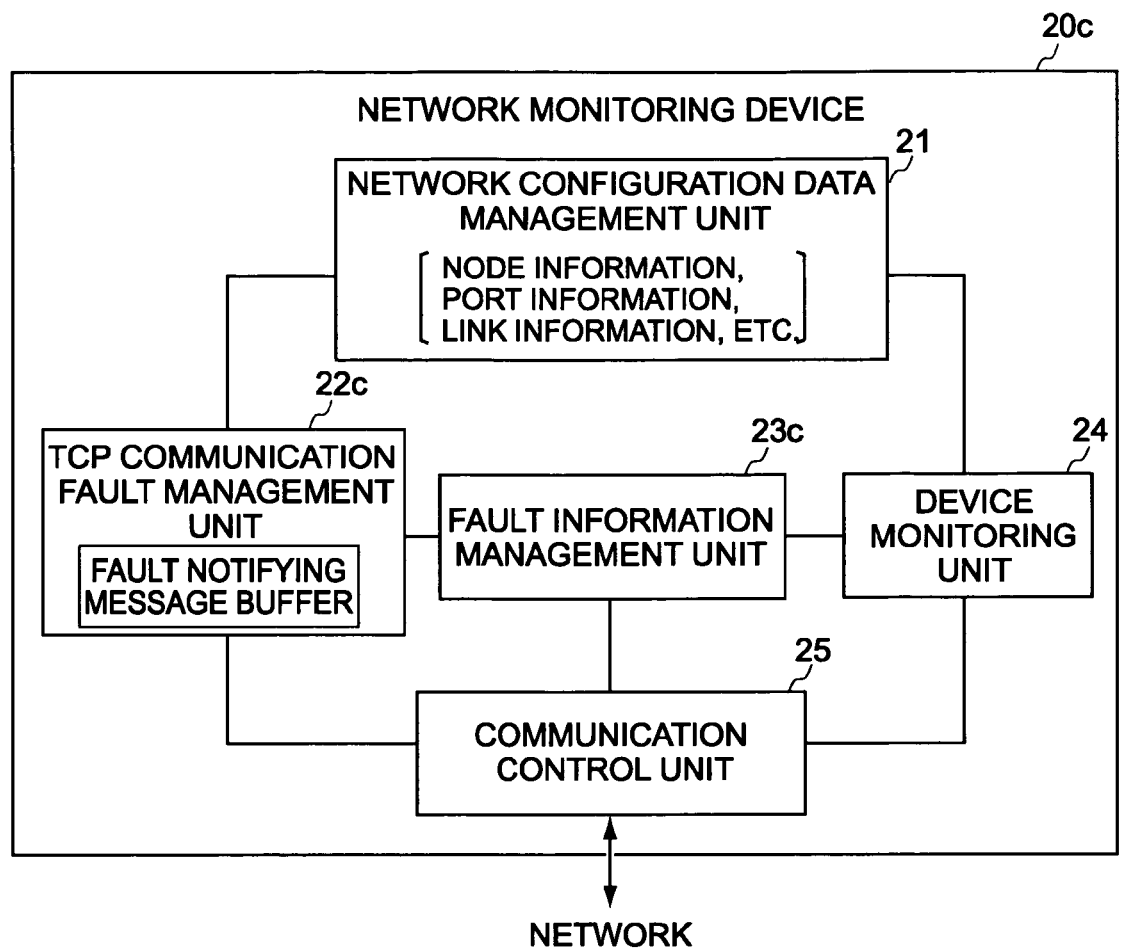
FIG. 24 is a functional block diagram of the network monitoring device partly configuring the network system according to a third embodiment.

The network system according to a third embodiment of the present invention involves using a network monitoring device 20c having a configuration shown in FIG. 24, which replaces the network monitoring device 20.

Specifically, the network monitoring device 20c used for the network system according to the third embodiment includes a network configuration data management unit 21, a TCP communication fault management unit 22c, a fault information management unit 23c, a device monitoring unit 24 and a communication control unit 25.

The network configuration data management unit 21, the device monitoring unit 24 and the communication control unit 25 provided in this network monitoring device 20c are the components respectively given the same designations as those of the components provided in the network monitoring device 20.

The TCP communication fault management unit 22c is a component different from the TCP communication fault management unit 22b in terms of only contents of processes (corresponding to the processes in steps S404 through S408 in FIG. 16) executed when the received fault notifying message is can be aggregated.

Figure 25:
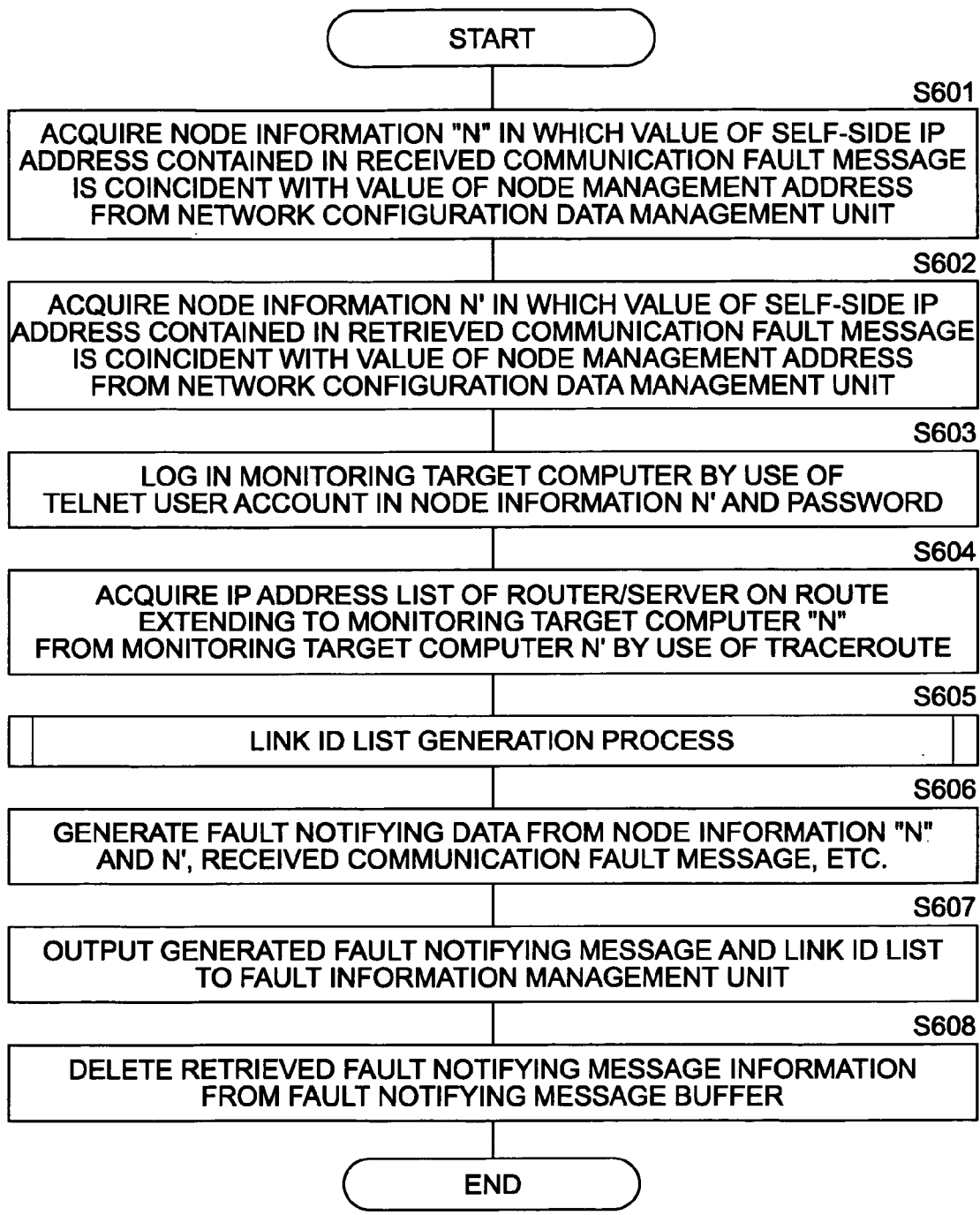
FIG. 25 is a flowchart showing an operating procedure of the TCP communication fault management unit in the network monitoring device according to the third embodiment.

To be specific, the TCP communication fault management unit 22c is the component that executes, when the received fault notifying message can be aggregated, processes in a procedure shown in FIG. 25.

Namely, when the received fault notifying message can be aggregated, the TCP communication fault management unit 22c acquires at first, from the network configuration data management unit 21, node information N in which a value of the self-side IP address contained in the received fault notifying message is coincident with a value of the node management address (step S601). Further, the TCP communication fault management unit 22c also acquires, from the network configuration data management unit 21, node information N' in which a value of the self-side IP address contained in the fault notifying message information retrieved from the fault notifying message buffer is coincident with a value of the node management address (step S602).

Subsequently, the TCP communication fault management unit 22c, after logging in a monitoring target computer N' (that is the monitoring target computer 10 specified by the node information N') by use of a Telnet user account and a password contained in the node information N' (step S603), acquires a list of port IP addresses (which will hereinafter be referred to as an IP address list) of the respective routers 50 on the communication path extending to the monitoring target computer N (that is the monitoring target computer 10 specified by the node information N) from the monitoring target computer N' by use of "traceroute" based on ICMP (Internet Control Message Protocol) protocol (step S604).

Figures 26, 27:
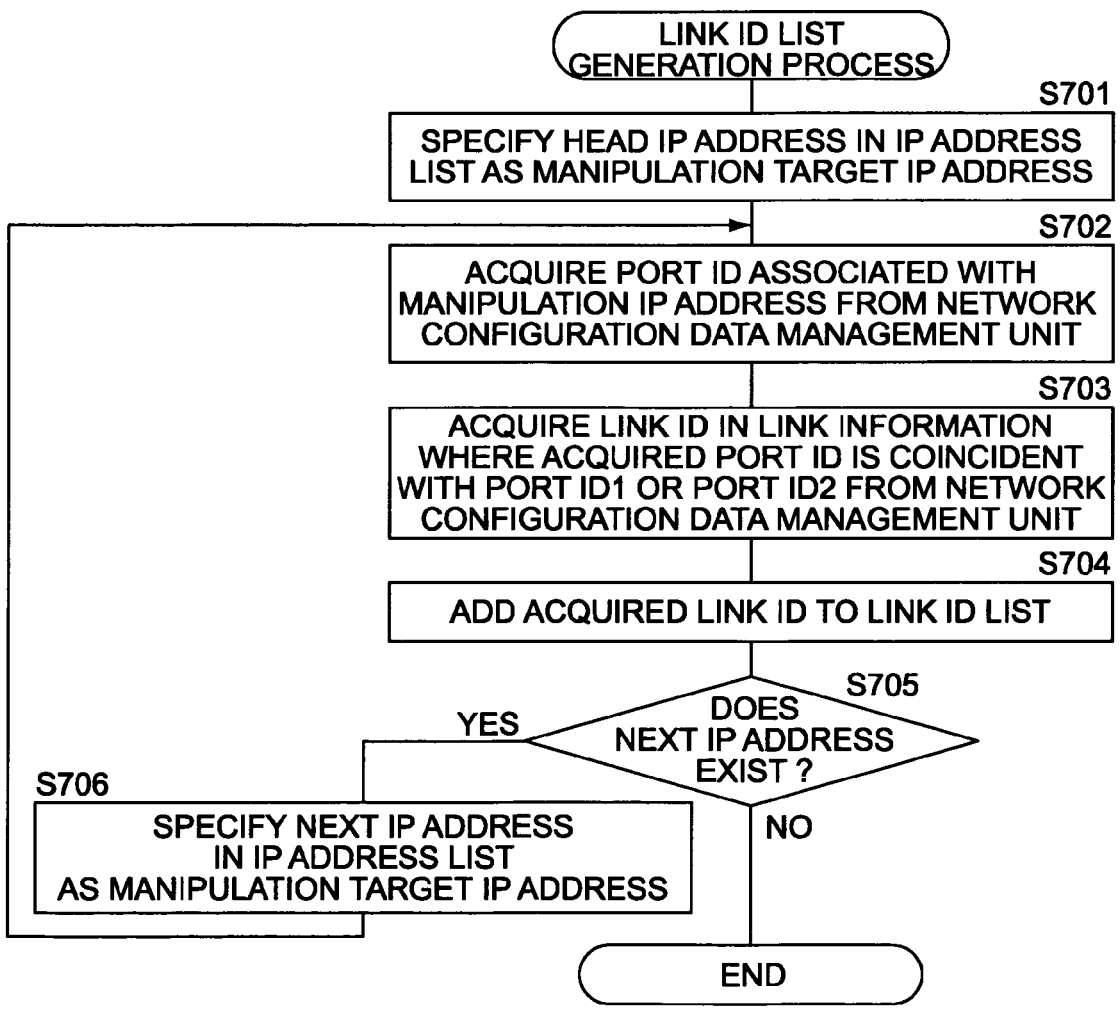
FIG. 26 is an explanatory diagram of an IP address list generated by the process in FIG. 25.
FIG. 27 is a flowchart of a link ID list generation process executed in the process in FIG. 25.

In short, the TCP communication fault management unit 22c executes the process in steps S603 and S604 for acquiring the IP address list having the contents as shown in FIG. 26 by remote-controlling the monitoring target computer N'.

Then, the TCP communication fault management unit 22c, which has acquired the IP address list, executes a link ID list generation process in step S605 in a procedure shown in FIG. 27. Note that port information connotes, in the following discussion, information (consisting of a port ID, and IP address, etc.) managed by the network configuration data management unit 21 in the form of a port information table having a structure as shown in FIG. 28. Further, link information connotes information (consisting of a link ID, a port ID1, a port ID2, etc.) managed by the network configuration data management unit 21 in the form of a link information table having a structure shown in FIG. 29.

To be specific, the TCP communication fault management unit 22c starting a link ID list generation process (FIG. 27) at first specifies a head IP address in the IP address list as a manipulation target address (step S701). Subsequently, the TCP communication fault management unit 22c executes a process of acquiring, from the network configuration data management unit 21, the port information containing an IP address coincident with the manipulation target IP address (step S702), and a process of acquiring, from the network configuration data management unit 21, the link information in which the port ID contained in the acquired port information is coincident with the port ID1 or the port ID2 (step S703).

The TCP communication fault management unit 22c, which has acquired the link information, after adding the link ID in the link information to the link ID list (step S704), judges whether or not a next IP address (an unprocessed IP address) exists in the IP address list (step S705). If the next IP address (the unprocessed IP address) exists in the IP address list (step S705; YES), the TCP communication fault management unit 22c specifies the next IP address in the IP address list as a manipulation target IP address (step S706), and thereafter starts processes from step S702 onward.

Then, the TCP communication fault management unit 22c, when completing the processing about all the IP addresses in the IP address list (step S705; NO), terminates this link ID list generation process.

The TCP communication fault management unit 22c finishing the link ID list generation process executes a process of generating the fault notifying data from the two sets of acquired node information N and N' (step S706). The process executed in this step is the same as executed in step S406 (FIG. 16).

Then, the TCP communication fault management unit 22c, which has generated the fault notifying data, executes a process of outputting, to the fault information management unit 23c, the fault notifying data and the link ID list generated by the link ID list generation process (step S707), and a process of deleting the retrieved fault notifying message information from the fault notifying message buffer (step S708), and thereafter finishes the processes in this Figure.

In short, the TCP communication fault management unit 22c is the component that, when the fault notifying message is sent from each of the two monitoring target computers 10 performing the TCP communications, supplies the fault information management unit 23c with the information (the link ID list) showing the routes employed for the TCP communications together with the fault notifying data.

Figure 30:
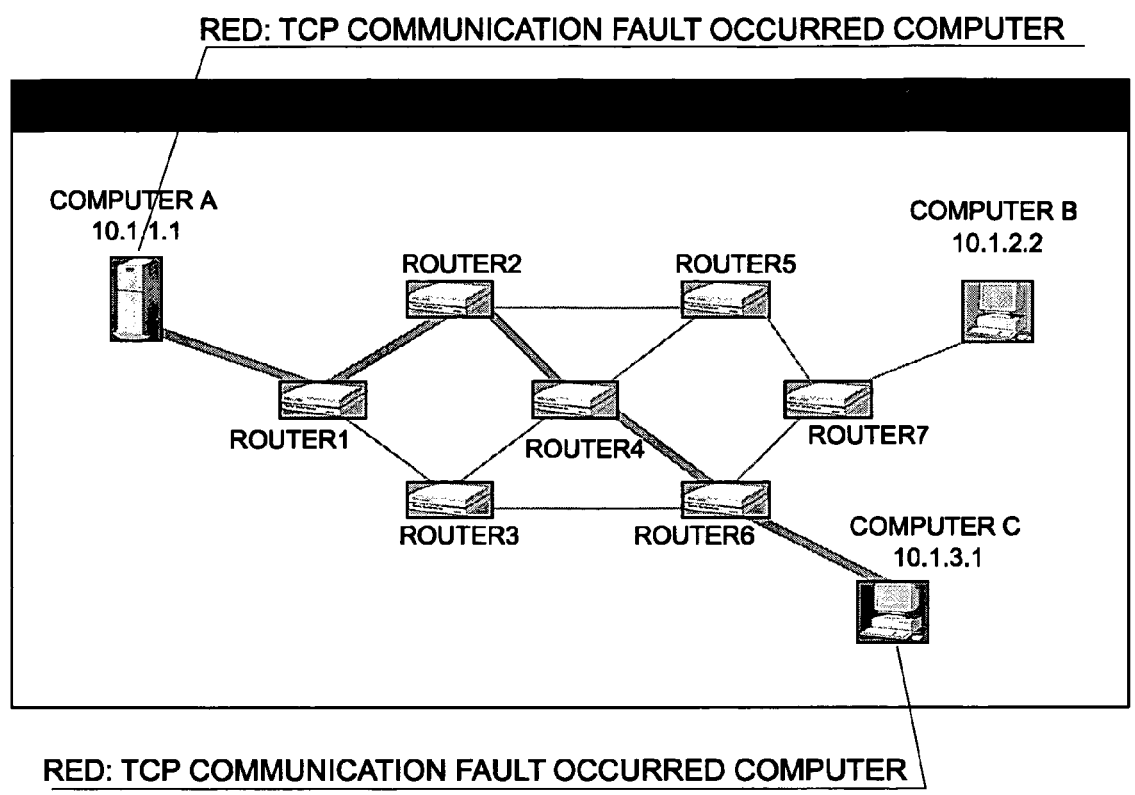
FIG. 30 is an explanatory diagram of a network configuration view screen displayed on the display of the operation terminal in the network system according to the third embodiment.

Then, the fault information management unit 23c is a component as an improved version of the fault information management unit 22b so as to be capable of displaying, based on the fault notifying data, the link ID list, etc. given from the TCP fault information management unit 22c, on the display of the operation terminal 30 a fault information list screen as shown in FIG. 30, i.e., the fault information list screen showing the links in a special form (using different colors and thickness in the third embodiment) that are employed for the communications between the two monitoring target computers 10 (the computer A and the computer C in FIG. 30) encountering the occurrence of the TCP communication faults.

The network system according to the third embodiment involves using the network monitoring device 20b that operates as described above. Accordingly, it follows that this network system functions as the system capable of easily troubleshooting the causes for the various abnormalities occurred within the system.

Fourth Embodiment

Figure 31:
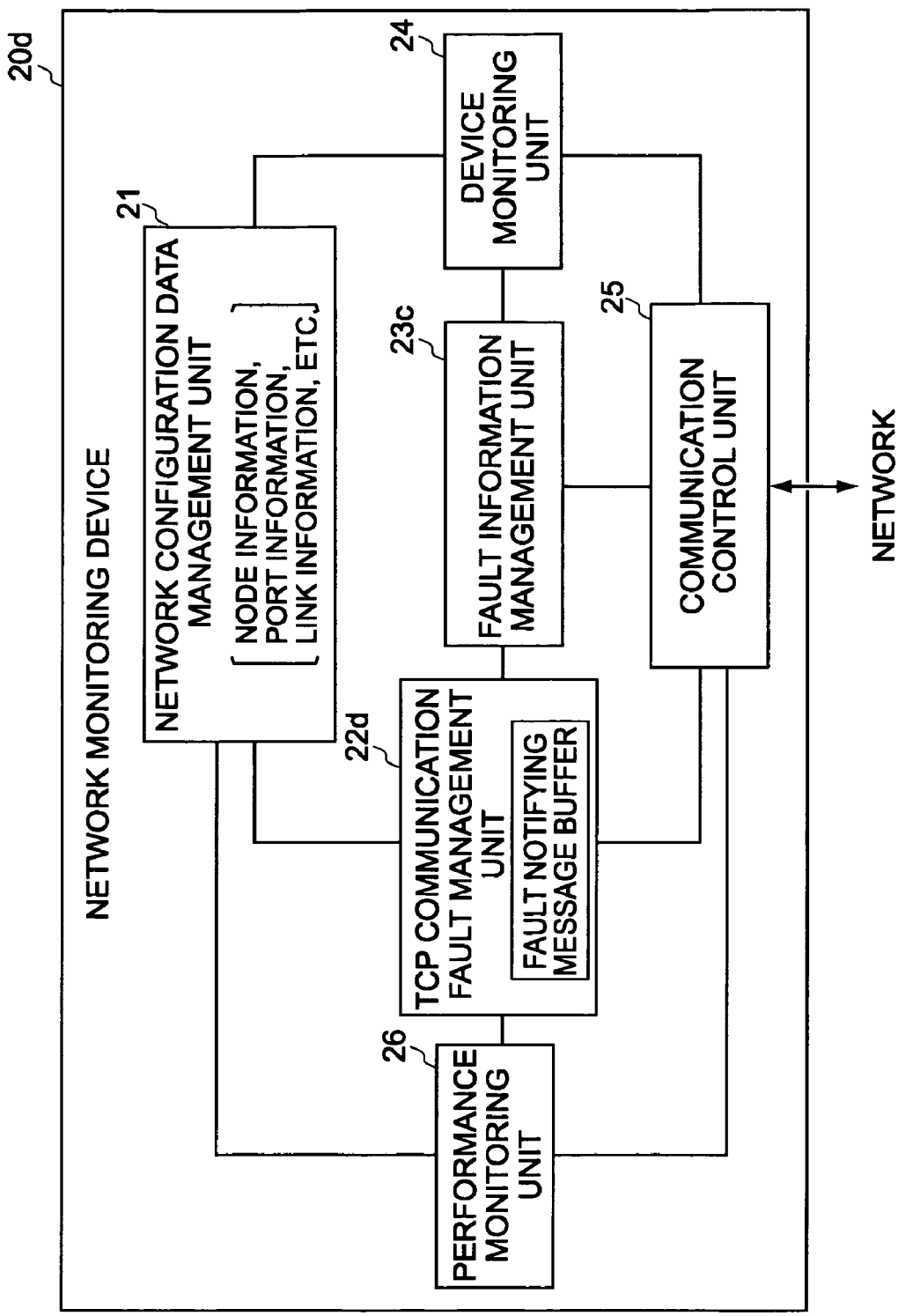
FIG. 31 is a functional block diagram of a network monitoring device partly configuring a network system according to a fourth embodiment.

The network system according to a fourth embodiment of the present invention employs a network monitoring device 20d having a configuration shown in FIG. 31 as a substitute for the network monitoring device 20.

To be specific, the network monitoring device 20d used for the network system according to the fourth embodiment includes a network configuration data management unit 21, a TCP communication fault management unit 22d, a fault information management unit 23c, a device monitoring unit 24, a communication control unit 25 and a performance monitoring unit 26.

The network configuration data management unit 21, the fault information management unit 23c, the device monitoring unit 24 and the communication control unit 25 provided in this network monitoring device 20d are the components respectively given the same designations as those of the components provided in the network monitoring device 20c (FIG. 24).

Figure 32:
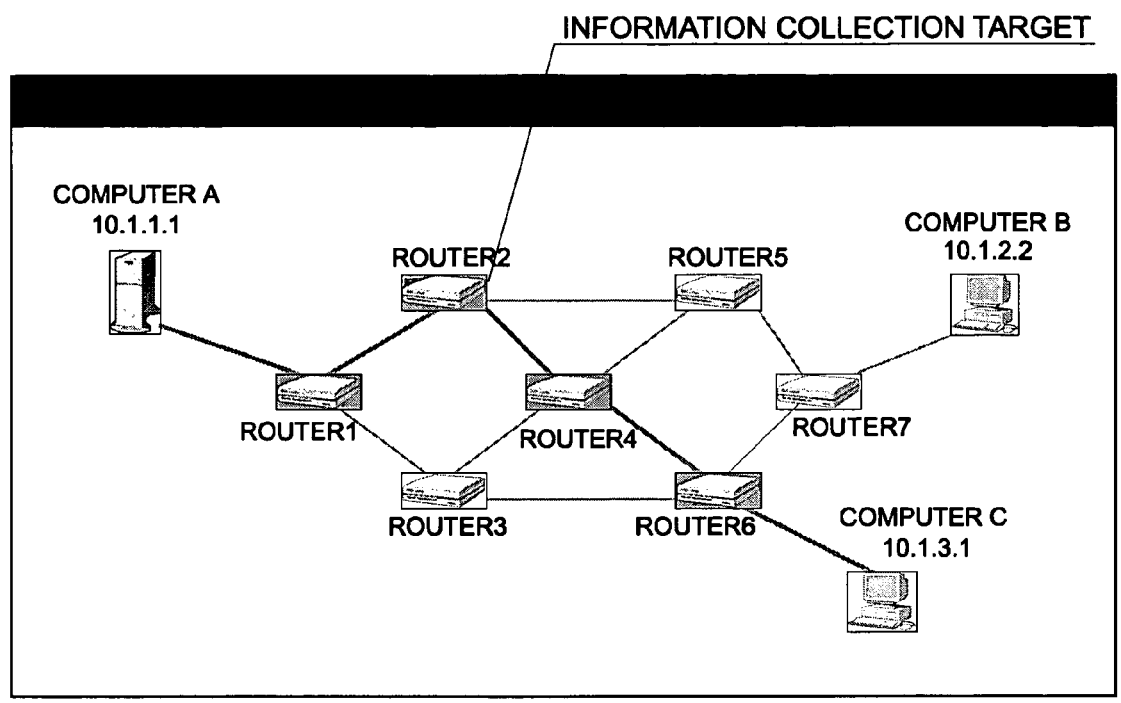
FIG. 32 is an explanatory diagram of a performance monitoring target setting screen displayed on the display of the operation terminal in the network system according to the fourth embodiment.

The performance monitoring unit 26 is a component having a function of collecting and managing pieces of performance information (such as a CPU activity ratio of the device, and traffic information [a packet transmitting/receiving rate, a discard packet rate, a collision rate, etc.]) of respective objects (nodes/ports) designated as monitoring target objects, and a function of displaying the thus collected and managed information on the display of the operation terminal 30 in response to a variety of requests given from the operation terminal 30. Further, the performance monitoring unit 26 is also the component having a function of displaying, on the display of the operation terminal 30, a performance monitoring target setting screen used for an operator to designate the monitoring target object. Note that the performance monitoring target setting screen displayed by this function is, though a detailed explanation is omitted, a screen where icons of the objects (information collection target objects) are, as exemplified in FIG. 32, displayed in a display mode different from usual.

Figure 33:
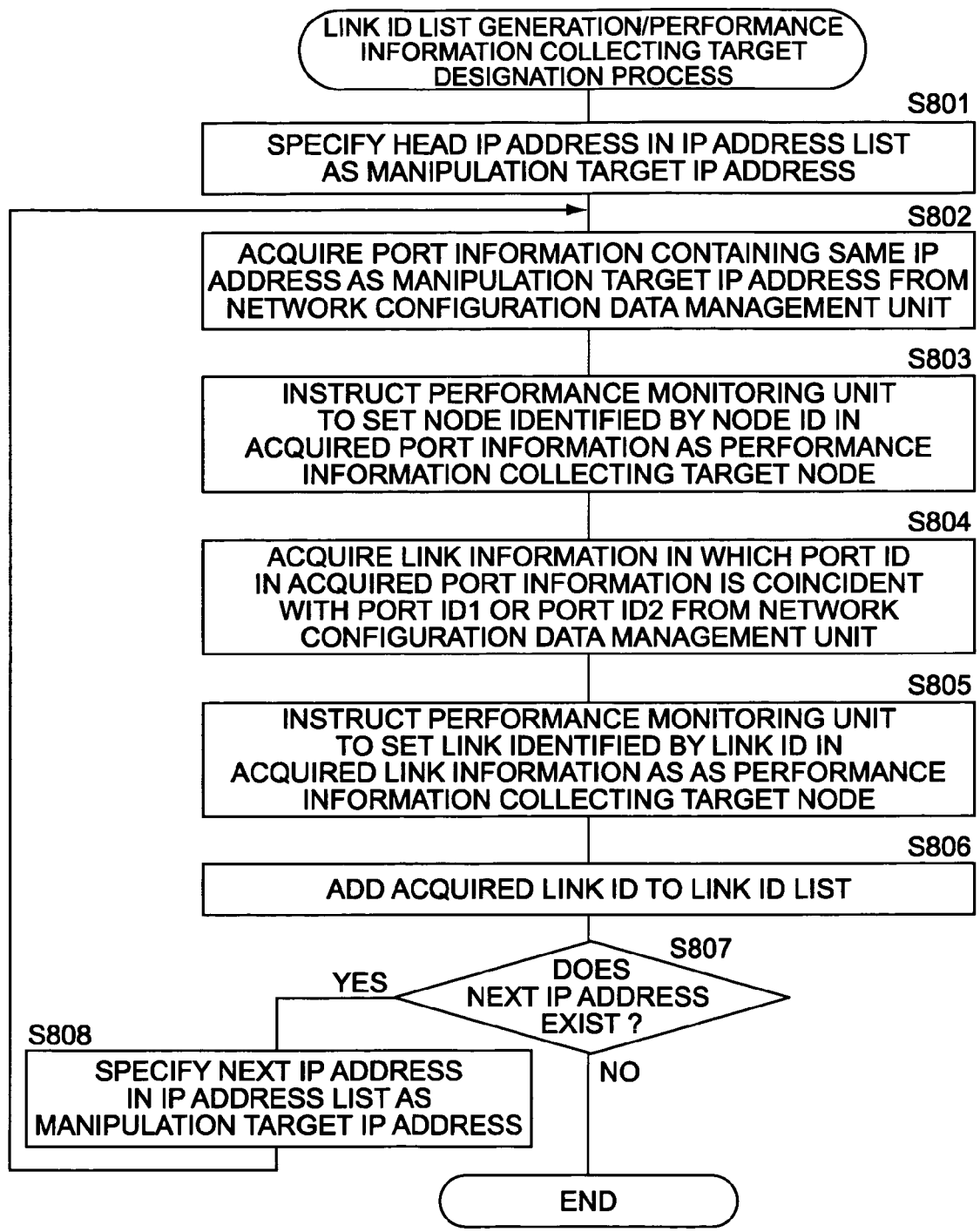
FIG. 33 is a flowchart of a link ID list generation/performance information collecting target designating process executed by the network monitoring device according to the fourth embodiment.

The TCP communication fault management unit 22d is a component as an improved version of the TCP communication fault management unit 22c so as to execute a link ID list generation/performance information collecting target designation process in a procedure shown in FIG. 33, which replaces the link ID list generation process (FIG. 25: step S605, FIG. 27).

To be specific, the TCP communication fault management unit 22d, if the fault notifying message received by the communication control unit 25 can be aggregated, starts the link ID list generation/performance information collecting target designation process. Then, the TCP communication fault management unit 22d, which has started the link ID list generation/performance information collecting target designation process, to begin with, specifies the head IP address in the IP address list as a manipulation target address (step S801). Subsequently, the TCP communication fault management unit 22d executes a process of acquiring, from the network configuration data management unit 21, port information containing the IP address coincident with the manipulation target IP address (step S802), and a process of instructing the performance monitoring unit 26 to set the node identified with the node ID contained in the acquired port information as a performance information collecting target node (step S803).

Moreover, the TCP communication fault management unit 22d executes a process of acquiring from the network configuration data management unit 21 the link information (see FIG. 19) in which the port ID contained in the acquired port information is coincident with the port ID1 or the port ID2 (step S804), and a process of instructing the performance monitoring unit 26 to set the link identified with the link ID in the acquired link information as the performance information collecting target link (step S805).

The TCP communication fault management unit 22d executing these processes adds the link ID in the acquired link information to the link ID list (step S806), and thereafter judges whether or not a next IP address (an unprocessed IP address) exists in the IP address list (step S807).

Then, the TCP communication fault management unit 22d, if the next IP address (the unprocessed IP address) exists in the IP address list (step S807; YES), specifies the next IP address in the IP address list as a manipulation target IP address (step S808), and thereafter starts processes from step S802 onward. If the next IP address does not exist (step S807; NO), the TCP communication fault management unit 22d terminates this link ID list generation/performance information collecting target designation process.

As obvious from the description made so far, in the network system according to the fourth embodiment, when the aggregation-enable fault notifying messages are transmitted to the network monitoring device 20 from the two unspecified monitoring target computers 10, the various objects (ports, links) employed for the TCP communications of these two monitoring target computers 10 are automatically set as the performance information monitoring target objects by the performance monitoring unit 26. Hence, this network system can be said to be the system capable of easily effecting in-depth analysis of the network state (in such a form as to have no necessity of designating the object to be monitored by the performance monitoring unit 26).

Modified Mode

The network system according to each of the embodiments discussed above can be modified in a variety of forms. For example, as substitutes for the network monitoring device, 20, 20b, 20c or 20d and the operation terminal 30 included in each network system, one single device/computer functioning as these devices can be also employed. Further, the network monitoring device 20, 20b, 20c or 20d can be also designed as a device constructed of a computer for processing the fault notifying data and a computer for detecting the normal physical fault.

What is claimed is:

1. A network system including a plurality of monitoring target computers, a network monitoring device and a plurality of network devices for relaying TCP communications, said plurality of monitoring target computers each comprising:
 a communication function for performing TCP communications with at least another one of the plurality of monitoring target computers; and
 an abnormal phenomenon occurrence notifying message sending function of monitoring an occurrence frequency of an abnormal phenomenon in each session of TCP communication performed by said communication function and, when the occurrence frequency of the abnormal phenomenon in each session of TCP communication performed by said communication function becomes larger than a specified value, sending an abnormal phenomenon occurrence notifying message showing a report that the abnormal phenomenon has occurred to said network monitoring device, said network monitoring device comprising:
 an operation status detecting function of detecting whether each of said plurality of network devices operates normally or not;
 a detection result display function of displaying a result of the detection by said operation status detecting function on a display;
 an abnormal phenomenon occurrence notifying message management function of managing the abnormal phenomenon occurrence notifying message sent by each monitoring target computer and of generating and managing, when receiving two abnormal phenomenon occurrence notifying messages within a predetermined period of time and the two abnormal phenomenon occurrence notifying messages are messages from two monitoring target computers among said plurality of monitoring target computers that transfer and receive information through the TCP communications with one another, an abnormal phenomenon occurrence notifying message into which these two abnormal phenomenon occurrence notifying messages are aggregated; and
 an occurred abnormal phenomenon presenting information display function of displaying, on the display, occurred abnormal phenomenon presenting information containing at least a piece of information indicating which monitoring target computer is a sender of the abnormal phenomenon occurrence notifying message with respect to every abnormal phenomenon occurrence notifying message managed by said abnormal phenomenon occurrence notifying message management function.

2. A network system according to claim 1, wherein said network monitoring device further comprises a route information display function of specifying the respective network devices utilized for the TCP communications between said two monitoring target computers that have sent the two abnormal phenomenon occurrence notifying messages aggregated by said abnormal phenomenon occurrence notifying message management function, and displaying a result of having specified said network devices on the display.

3. A network system according to claim 2, wherein said network monitoring device further comprises a second operation status detecting function capable of detecting a more detailed operation status of said each network device designated as an operation status detecting target device than the operation status of each network device as detected by the operation status detecting function, and displaying a result of the detection of the operation status of said each network device on the display, and
 wherein said route information display function of said network monitoring device is a function of designating said each network device, which has been specified as the device employed for the TCP communications between said two monitoring target computers, as an operation status detection target device by said second operation status detecting function.

4. A network system according to claim 3, wherein the display is a display connected to a computer different from said network monitoring device.

5. A network monitoring method for monitoring a network system including a plurality of monitoring target computers and a plurality of network devices for relaying TCP communications, comprising:

an operation status detecting step of detecting whether each of the plurality of network devices normally operates or not;

a detection result displaying step of displaying a result of the detection by the operation status detecting step on a display;

an abnormal phenomenon occurrence notifying message management step of receiving and managing an abnormal phenomenon occurrence notifying message sent by each monitoring target computer when an occurrence frequency of the abnormal phenomenon in the on-performing TCP communications becomes larger than a specified value and of generating and managing, when receiving two abnormal phenomenon occurrence notifying messages within a predetermined period of time and the two abnormal phenomenon occurrence notifying messages are messages from two monitoring target computers among said plurality of monitoring target computers that transfer and receive information through the TCP communications with one another, an abnormal phenomenon occurrence notifying message into which these two abnormal phenomenon occurrence notifying messages are aggregated; and an occurred abnormal phenomenon presenting information display step of displaying, on the display, occurred abnormal phenomenon presenting information containing at least a piece of information indicating which monitoring target computer is a sender of the abnormal phenomenon occurrence notifying message with respect to every abnormal phenomenon occurrence notifying message managed by the abnormal phenomenon occurrence notifying message management step.

6. A network monitoring method according to claim 5, further comprising a route information display step of specifying the respective network devices utilized for the TCP communications between the two monitoring target computers that have sent the two abnormal phenomenon occurrence notifying messages aggregated by the abnormal phenomenon occurrence notifying message management step, and displaying a result of having specified the network devices on the display.

7. A network monitoring method according to claim 6, further comprising a second operation status detecting step capable of detecting a more detailed operation status of the each network device designated as an operation status detecting target device than the operation status of each network device as detected by the operation status detecting step, and displaying a result of the detection of the operation status of the each network device on the display, and wherein the route information display step is a step of designating the each network device, which has been specified as the device employed for the TCP communications between the two monitoring target computers, as an operation status detection target device by the second operation status detecting step.

* * * * *